United States Patent
Wilson-Langman et al.

(10) Patent No.: US 9,348,020 B2
(45) Date of Patent: May 24, 2016

(54) OFFSET FREQUENCY HOMODYNE GROUND PENETRATING RADAR

(71) Applicants: Alan Wilson-Langman, Milnerton (ZA); Kenneth J. Ryerson, Pella, IA (US); Walter Rothe, Pella, IA (US)

(72) Inventors: Alan Wilson-Langman, Milnerton (ZA); Kenneth J. Ryerson, Pella, IA (US); Walter Rothe, Pella, IA (US)

(73) Assignee: VERMEER MANUFACTURING COMPANY, Pella, IA (US)

( * ) Notice: Subject to any disclaimer, the term of this patent is extended or adjusted under 35 U.S.C. 154(b) by 379 days.

(21) Appl. No.: 13/797,929

(22) Filed: Mar. 12, 2013

(65) Prior Publication Data
US 2013/0234879 A1    Sep. 12, 2013

Related U.S. Application Data

(60) Provisional application No. 61/609,715, filed on Mar. 12, 2012.

(51) Int. Cl.
| G01S 13/89 | (2006.01) |
| G01S 13/02 | (2006.01) |
| G01S 13/88 | (2006.01) |
| G01S 7/35 | (2006.01) |

(52) U.S. Cl.
CPC ............ G01S 13/0209 (2013.01); G01S 7/352 (2013.01); G01S 13/885 (2013.01)

(58) Field of Classification Search
CPC .. G01S 13/885; G01S 13/0209; G01S 13/106
USPC ...................... 342/22, 27, 191, 196
See application file for complete search history.

(56) References Cited

U.S. PATENT DOCUMENTS

| 3,288,242 A | 11/1966 | Loeb |
| 3,852,743 A | 12/1974 | Gupta |
| 4,297,699 A | 10/1981 | Fowler et al. |
| 4,430,653 A | 2/1984 | Coon et al. |
| 4,492,865 A | 1/1985 | Murphy et al. |
| 4,504,833 A * | 3/1985 | Fowler ................ G01S 13/0209 324/337 |
| 4,676,695 A | 6/1987 | Duthweiler |
| 4,686,475 A | 8/1987 | Kober et al. |

(Continued)

FOREIGN PATENT DOCUMENTS

| DE | 9108986 | 12/1991 |
| DE | 9214241 | 1/1993 |

(Continued)

OTHER PUBLICATIONS

"AD8349 Data Sheet Rev. B", http://www.analog.com/static/imported-files/data_sheet/AD8349.pdf, Feb. 24, 2012.

(Continued)

*Primary Examiner* — John B Sotomayor
*Assistant Examiner* — Marcus Windrich
(74) *Attorney, Agent, or Firm* — Hollingsworth Davis, LLC

(57) ABSTRACT

Systems and methods involve generating a baseband signal, up-converting the baseband signal to a radar signal frequency, filtering a lower sideband of the up-converted signal, and transmitting the filtered up-converted signal. Systems and methods also involve receiving a return signal, down-converting the return signal using a signal having a frequency offset from the up-converted signal, filtering the upper sideband of the down-converted return signal, and producing a baseband return signal.

24 Claims, 18 Drawing Sheets

(56) References Cited

U.S. PATENT DOCUMENTS

| | | | |
|---|---|---|---|
| 4,698,634 A | 10/1987 | Alongi et al. |
| 4,709,237 A | 11/1987 | Poullain et al. |
| 4,710,708 A | 12/1987 | Rorden et al. |
| 4,728,897 A | 3/1988 | Gunton |
| 4,806,869 A | 2/1989 | Chau et al. |
| 4,814,768 A | 3/1989 | Chang |
| 4,843,597 A | 6/1989 | Gjessing et al. |
| 4,873,513 A | 10/1989 | Soults et al. |
| 4,896,116 A | 1/1990 | Nagashima et al. |
| 4,899,322 A | 2/1990 | Crutcher et al. |
| 4,905,008 A | 2/1990 | Kawano et al. |
| 4,912,643 A | 3/1990 | Beirne |
| 5,033,031 A | 7/1991 | Bohman |
| 5,065,098 A | 11/1991 | Salsman et al. |
| 5,092,657 A | 3/1992 | Bryan, Jr. |
| 5,103,920 A | 4/1992 | Patton |
| 5,113,192 A | 5/1992 | Thomas |
| 5,264,795 A | 11/1993 | Rider |
| 5,274,557 A | 12/1993 | Moriya et al. |
| 5,321,613 A | 6/1994 | Porter et al. |
| 5,325,095 A | 6/1994 | Vadnais et al. |
| 5,337,002 A | 8/1994 | Mercer |
| 5,339,080 A | 8/1994 | Steinway et al. |
| 5,341,886 A | 8/1994 | Patton |
| 5,357,253 A | 10/1994 | Van Etten |
| 5,365,442 A | 11/1994 | Schmidt |
| 5,370,478 A | 12/1994 | Bartlett et al. |
| 5,375,663 A | 12/1994 | Teach |
| 5,384,715 A | 1/1995 | Lytton |
| 5,410,252 A | 4/1995 | Potter et al. |
| 5,412,623 A | 5/1995 | Asada et al. |
| 5,446,981 A | 9/1995 | Kamada et al. |
| 5,469,155 A | 11/1995 | Archambeault et al. |
| 5,471,771 A | 12/1995 | Gilbert |
| 5,499,029 A | 3/1996 | Bashforth et al. |
| 5,509,220 A | 4/1996 | Cooper |
| 5,512,834 A | 4/1996 | McEwan |
| 5,528,518 A | 6/1996 | Bradshaw et al. |
| 5,544,052 A | 8/1996 | Fujita et al. |
| 5,546,572 A | 8/1996 | Seto et al. |
| 5,553,407 A | 9/1996 | Stump |
| 5,585,726 A | 12/1996 | Chau |
| 5,607,205 A | 3/1997 | Burdick et al. |
| 5,614,670 A | 3/1997 | Nazarian et al. |
| 5,631,970 A | 5/1997 | Hsu |
| 5,633,589 A | 5/1997 | Mercer |
| 5,644,237 A | 7/1997 | Eslambolchi et al. |
| 5,659,985 A | 8/1997 | Stump |
| 5,673,050 A | 9/1997 | Moussally et al. |
| 5,682,136 A | 10/1997 | Del Signore |
| 5,698,981 A | 12/1997 | Mercer |
| 5,704,142 A | 1/1998 | Stump |
| 5,711,381 A | 1/1998 | Archambeault et al. |
| 5,720,354 A | 2/1998 | Stump et al. |
| 5,746,278 A | 5/1998 | Bischel |
| 5,757,320 A | 5/1998 | McEwan |
| 5,764,062 A | 6/1998 | Mercer |
| 5,767,678 A | 6/1998 | Mercer |
| 5,769,503 A | 6/1998 | Stolarczyk et al. |
| 5,774,091 A | 6/1998 | McEwan |
| 5,786,537 A | 7/1998 | Anstey |
| 5,805,110 A | 9/1998 | McEwan |
| 5,819,859 A | 10/1998 | Stump et al. |
| 5,825,660 A | 10/1998 | Cagan et al. |
| 5,844,564 A | 12/1998 | Bennis et al. |
| 5,867,117 A | 2/1999 | Gogineni et al. |
| 5,872,537 A | 2/1999 | Siweris |
| 5,904,210 A | 5/1999 | Stump et al. |
| 5,933,014 A | 8/1999 | Hartrumpf et al. |
| 6,014,343 A | 1/2000 | Graf et al. |
| 6,035,951 A | 3/2000 | Mercer et al. |
| 6,072,427 A | 6/2000 | McEwan |
| 6,078,869 A | 6/2000 | Gunasekera |
| 6,088,294 A | 7/2000 | Leggett, III et al. |
| 6,106,561 A | 8/2000 | Farmer |
| 6,119,804 A | 9/2000 | Owen |
| 6,150,976 A | 11/2000 | Cooley |
| 6,151,555 A | 11/2000 | Van Bemmel et al. |
| 6,195,922 B1 | 3/2001 | Stump |
| 6,216,540 B1 | 4/2001 | Nelson |
| 6,225,941 B1 | 5/2001 | Gogineni et al. |
| 6,252,538 B1 | 6/2001 | Chignell |
| 6,302,221 B1 | 10/2001 | Hamman et al. |
| 6,307,573 B1 | 10/2001 | Barros |
| 6,308,787 B1 | 10/2001 | Alft |
| 6,313,755 B1 | 11/2001 | Hetmaniak et al. |
| 6,315,062 B1 | 11/2001 | Alft et al. |
| 6,327,533 B1 | 12/2001 | Chou |
| 6,363,320 B1 | 3/2002 | Chou |
| 6,373,486 B1 | 4/2002 | Simpson |
| 6,377,201 B1 | 4/2002 | Chu |
| 6,377,210 B1 | 4/2002 | Moore |
| 6,389,360 B1 | 5/2002 | Alft et al. |
| 6,414,627 B1 | 7/2002 | McEwan |
| 6,435,286 B1 | 8/2002 | Stump et al. |
| 6,437,726 B1 | 8/2002 | Price |
| 6,462,696 B1 | 10/2002 | Gorman |
| 6,477,795 B1 | 11/2002 | Stump |
| 6,484,818 B2 | 11/2002 | Alft et al. |
| 6,501,413 B2 | 12/2002 | Annan et al. |
| 6,522,290 B2 | 2/2003 | Mattox |
| 6,532,190 B2 | 3/2003 | Bachrach |
| 6,617,856 B1 | 9/2003 | Royle |
| 6,664,914 B2 * | 12/2003 | Longstaff ............ G01S 13/0209 342/194 |
| 6,667,709 B1 | 12/2003 | Hansen et al. |
| 6,700,526 B2 | 3/2004 | Witten |
| 6,701,647 B2 | 3/2004 | Stump |
| 6,719,069 B2 | 4/2004 | Alft et al. |
| 6,739,165 B1 | 5/2004 | Strack |
| 6,751,553 B2 | 6/2004 | Young et al. |
| 6,755,263 B2 | 6/2004 | Alft et al. |
| 6,766,253 B2 | 7/2004 | Burns et al. |
| 6,833,795 B1 | 12/2004 | Johnson et al. |
| 6,886,644 B2 | 5/2005 | Stump et al. |
| 6,915,211 B2 | 7/2005 | Kram et al. |
| 6,975,942 B2 | 12/2005 | Young et al. |
| 6,980,482 B2 | 12/2005 | Faichney et al. |
| 7,013,991 B2 * | 3/2006 | Wilson-Langman ... E21B 47/00 175/40 |
| 7,034,740 B2 | 4/2006 | Witten |
| 7,065,446 B2 | 6/2006 | Chou |
| 7,072,668 B2 | 7/2006 | Chou |
| 7,085,196 B2 | 8/2006 | Nemeth |
| 7,113,124 B2 | 9/2006 | Waite |
| 7,123,016 B2 | 10/2006 | Larsen |
| 7,143,844 B2 | 12/2006 | Alft et al. |
| 7,182,151 B2 | 2/2007 | Stump et al. |
| 7,184,611 B2 | 2/2007 | Miyagi et al. |
| 7,202,801 B2 | 4/2007 | Chou |
| 7,218,244 B2 | 5/2007 | Jin et al. |
| 7,400,976 B2 | 7/2008 | Young et al. |
| 7,424,133 B2 | 9/2008 | Schultz et al. |
| 7,612,704 B2 | 11/2009 | Ryerson et al. |
| 7,676,534 B2 | 3/2010 | Murakami et al. |
| 7,773,205 B2 * | 8/2010 | Cooper ................. G01S 13/887 342/132 |
| 7,930,103 B2 | 4/2011 | Young et al. |
| 8,207,887 B2 | 6/2012 | Goldman |
| 8,280,634 B2 | 10/2012 | Young et al. |
| 2002/0130806 A1 | 9/2002 | Taylor et al. |
| 2003/0012411 A1 | 1/2003 | Sjostrom et al. |
| 2003/0090406 A1 * | 5/2003 | Longstaff ............ G01S 13/0209 342/22 |
| 2004/0168358 A1 | 9/2004 | Stump |
| 2008/0079723 A1 | 4/2008 | Hanson et al. |
| 2008/0088503 A1 * | 4/2008 | Beasley ................ G01S 13/343 342/200 |
| 2009/0251361 A1 * | 10/2009 | Beasley ................ G01S 7/354 342/169 |
| 2011/0202277 A1 * | 8/2011 | Haddad ................ G01S 13/885 702/7 |

(56) References Cited

U.S. PATENT DOCUMENTS

FOREIGN PATENT DOCUMENTS

| | | |
|---|---|---|
| DE | 19509934 | 10/1995 |
| DE | 19845330 | 4/2000 |
| DE | 10018031 | 10/2001 |
| EP | 0269283 | 6/1988 |
| EP | 0289623 | 9/1993 |
| FR | 2673002 | 8/1992 |
| JP | 03187423 | 8/1991 |
| JP | 6230141 | 8/1994 |
| NL | 9002065 | 4/1992 |

OTHER PUBLICATIONS

Aaltonen et al., "Geological Mapping Using GPR and Differential GPS Positioning: A Case Study", Proceedings of the Ninth International Conference on GPR, Apr. 29-May 2, 2002, Santa Barbara, California, pp. 207-210.
Akita et al., "Practical Usage and Future Prospects of a Mapping System Using a Pen-Based Computer", Proceedings AM/FM International Annual Conference, Mar. 20, 1995, pp. 699-707.
Alippi et al., "Hardware Requirements for Digital VLSI Implementation of Neural Networks", IEEE International Joint Conference on Neural Networks, vol. 3, 1991, pp. 1873-1878 (Abstract only).
AWPA—"Uniform Color Code", Mar. 6, 2001—http://web.archive.org/web/20010306004125/http://www.callbeforeyoudig.org/color.htm.
Baker et al., "Source-Dependent Frequency Content of Ultrashallow Seismic Reflection Data", Bulletin of the Seismological Society of America, 90, 2, p. 494-499, Apr. 2000.
Bakhtar et al., "Testing and UXO Detection Using US Air Force EarthRadar System," Mar. 1996.
Bernold et al., "A Multi-Sensory Approach to 3-D Mapping of Underground Utilities", 19th Proceedings of International Symp. on Automation & Robotics in Construction, Sep. 23-25, 2002.
Chuang et al., "A Highly Capable Arbitrary Waveform Generator for Next Generation Radar Systems", Aerospace Conference, 2006 IEEE, 5 pages.
"Ditch Witch Subsite Trac Management System Plus", http://www.ditchwitch.com/produtct/productview/138 Accessed Aug. 13, 2002.
Dobecki et al. "Geotechnical and Groundwater Geophysics." Geophysics, vol. 50, No. 12, Dec. 1985, p. 2621-2636 (abstract only).
"Drill Path," Infrasoft, LLC., Computer Software for Solving Infrastructure Problems, 2916 West T.C. Jester, Houston, Texas 77018, 20 pages.
Dussauge-Peisser et al., Investigation of a fractured limestone cliff (Chartreuse Massif, France) using seismic tomography and ground-penetrating radar Near Surface Geophysics, 1, 161-170, Aug. 2003.
Farquharson et al., "A 50-800 MHz stepped frequency continuous wave ground penetrating radar", Communications and Signal Processing, 1998. Comsig '98. Proceedings of the 1998 South African Symposium on Rondebosch, South Africa 7-8 Sep. 7-8, 1998. New York, NY, USA, IEEE, US, pp. 455-460. (abstract only).
Fenning et al., Geophysical Methods for the Location of Underground Storage Tanks, Article (no copy available).
Figdor et al. "Geophysical reconnaissance of covered waste disposal grounds." OEIAZ Austrian Engineer and Architects' Magazine, vol. 134, No. 9, Austria, Sep. 1989. pp. 450-456 (no copy available).
Frohlich et al., "Exploring geo-scientific data in virtual environments", Proceedings of the Conference on Visualization 1999: Celebrating Ten Years, IEEE Visualization, IEEE Computer Society Press, Los Alamitos, CA, pp. 169-173, Oct. 1999.
Guenther et al., Proceedings of the Fifth International Conference on Ground Penetrating Radar, The Geophysical Investigation of Drilling Obstacles for Microtunnelling Projects by Means of GPR, vol. 3 of 3, Jun. 1994, pp. 1151-1165. (Abstract only).
Haizhong et al., Derivative Seismic Processing Method for GPR Data, 1997 IEEE, pp. 145-147. (Abstract only).

Herman, "Robotic Subsurface Mapping Using Ground Penetrating Radar", PhD thesis, Carnegie Mellon University, May 1997, 143 pages.
Hodgson, "Computerized Well Planning for Directional Wells", SPE, No. 12071, Oct. 8, 1983, pp. 1-6 (abstract only).
Hussain et al., Application of Migration to Ground Probing Radars, 1988 IEEE, pp. 1208-1211. (Abstract only).
Kathage, Proceedings of the Fourth International Conference on Ground Penetrating Radar, Geological Survey of Finland, A Challenge: GPR in Advance of Horizontal Drilling, Special Paper 16, Jun. 1992, pp. 119-124. (Abstract only).
Lee, "A GNU Radio Based Software-Defined Radar", http://etd.ohiolink.edu/send-pdf.cgi/PattonLee.pdf?wright1176142845, Apr. 9, 2007.
Liu, "Using GPR and seismic reflection measurements to characterize buried objects: large-scale simulation." IGARSS '97. 1997 in'tl Geoscience and Remote Sensing Symposium. pp. 1147-1149, vol. 3.
Liu et al. "Identification of paleo-liquefaction and deformation features with GPR in the New Madrid seismic zone." The 8th Int'l Conference of Ground Penetrating Radar. Goldcoast, May 23-26, 2000. vol. 4084, pp. 383-389 (abstract only).
McFee et al., "Multisensor vehicle-mounted teleoperated mine detector with data fusion", Proc. SPIE, vol. 3392, 1082, 1998, abstract only.
Parker, "Buried Facility Locating with GPS Interface," GBIS '99, Edmonton, Dec. 1999.
Powers et al., "Integrated Use of Continuous Seismic-Reflection Profiling and Ground-Penetrating Radar Methods at John's Pond, Cape Cod, Massachusetts", 12th Proceeding on Applications of Geophysics to Eng. & Environment, 1999 (abstract only).
Reinhard et al., "An IQ-modulator based heterodyne 77-GHz FMCW radar", Microwave Conference (GEMIC), 2011 German, IEEE, Mar. 14, 2011, pp. 1-4. (abstract only).
Santos, "The Development and Field Application of a 3D Computer Graphics System for Displaying Wellbore Trajectories", SPE, No. 29197, Nov. 10, 1994, pp. 371-382.
Schwamborn et al. "Ground penetrating radar and shallow seismic-stratigraphic and permafrost investigations of Lake Nikolay, Delta Lena and Arctic Siberia." The 8th Int'l Conference of Ground Penetrating Radar. Goldcoast, May 23-26, 2000. vol. 4084, 2000, pp. 783-789 (abstract only).
Shoemaker et al., "Reflection Seismic and Ground Penetrating Radar Study of Previously Mined (Lead/Zinc) Ground", Joplin, Missouri, Missouri Department of Transportation special publication, 2000, 15 pages.
Tektronix, "Generating Advanced Radar Signals Using Arbitrary Waveform Generators", www.tektronix.com/signal_generators. 26 pages, 2012.
Van der Veen et al., "Design and application of a towed land-streamer system for cost-effective 2-D and pseudo-3-D shallow seismic data acquisition", Geophysics, vol. 66, No. 2, (Mar.-Apr. 2001), p. 482-500.
Van Dijk et al., "Multi-mode FMCW radar array with independent digital beam steering for transmit and receive", 2008 5$^{th}$ European Radar Conference (EURAD 2008); Oct. 30-31, 2008, Amsterdam, Netherlands, IEEE, Piscataway, NJ. pp. 412-415. (abstract only).
Well et al. Investigations of Hazardous Waste Sites Using Thermal IR and Ground Penetrating Radar, Photogrammetric Engineering & Remote Sensing, vol. 60, No. 8, Aug. 1994, pp. 999-1005. (Abstract only).
White, "Building an Urban Image." Archeologia e Calcolatori (International Association of Computing in Archaeology, Rome Italy), vol. 7, 1996, 137-147 (abstract only).
Yasunaga et al., "Design, Fabrication and Evaluation of a 5-inch Wafer Scale Neural Network LSI Composed of 576 Neurons", IEEE International Joint Conference on Neural Networks, vol. II, 1990, pp. 527-535.
Yoder et al., "Mapping agricultural fields with GPR and EMI to predict offsite movement of agrochemicals", Proc. SPIE, vol. 4084, 20, 2000, abstract only.
CHEMRAD Tennessee Corporation, USRADS Series 2100, Brochure (no copy available).

(56) References Cited

OTHER PUBLICATIONS

Geophysical Survey Systems, Inc.,RADAN™—Radar Data Analyzer, Production Information Sheet, Jan. 1993 (no copy available).

Geophysical Survey Systems, Inc., Subsurface Solutions, Winter 1995. (no copy available).

Geophysical Survey System, Inc., SIR® System-2 Subsurface Interface Radar, Brochure (no copy available), 1995.

Geophysical Survey System, Inc., SIR® System-10A Subsurface Interface Radar, Brochure (no copy available), 1995.

Geophysical Survey System, Inc., SIR® System Antennas, Brochure (no copy available), 1995.

Geophysical Survey System, Inc., Model 3200MLF, Multiple, Low-Frquency, Bistatic Antenna, Brochure (no copy available), 1995.

Geophysical Survey System, Inc., Subsurface Detection Problems, Brochure (no copy available), 1995.

GeoRadar, Inc., Model 1000B, Stepped-FM Ground Penetrating Radar, Brochure (no copy available).

Pollution Engineering, Peering Beneath the Surface, Article, Oct. 1992. (no copy available).

Sensors & Software, Inc., Pulse™ 100, Features, Brochure (no copy available), 1994.

Sensors & Software, Inc., Pulse EKKO™ 100, Ground Penetrating Radar Technology, Brochure. (no copy available), 1994.

Sensors & Software, Inc., Pulse EKKO™ 100, Case Studies, pp. 80-83, 87-94, 98, 100, 129, 131. (no copy available), 1994.

Sensors & Software, Inc., Pulse EKKO™ 1000, Brochure. (no copy available), 1994.

Sensors & Software, Inc., Pulse EKKO™, Environment, Feb. 1994. (no copy available).

International Search Report and Written Opinion dated Jun. 14, 2013 for PCT Application No. PCT/US2013/030618, 14 pages, Apr. 7, 2003.

* cited by examiner

OFFSET FREQUENCY HOMODYNE GROUND PENETRATING RADAR

RELATED PATENT DOCUMENTS

This application claims the benefit of Provisional Patent Application Ser. No. 61/609,715 filed on Mar. 12, 2012, to which priority is claimed pursuant to 35 U.S.C. §119(e) and which is hereby incorporated herein by reference in its entirety.

SUMMARY

Embodiments are directed to methods involving generating a baseband signal, up-converting the baseband signal to a radar signal frequency, filtering a lower sideband of the up-converted signal, and transmitting the filtered up-converted signal. Methods also involve receiving a return signal, down-converting the return signal using a signal having a frequency offset from the up-converted signal, filtering the upper sideband of the down-converted return signal, and producing a baseband return signal.

According to other embodiments, methods involve generating a baseband signal, mixing the baseband signal with a transmit oscillator signal to produce a mixed transmit signal comprising a lower sideband and an upper sideband, filtering the lower sideband of the mixed transmit signal, and transmitting the filtered mixed transmit signal. Methods also involve receiving a return signal resulting from transmitting the filtered mixed transmit signal and generating a receive oscillator signal having a frequency offset from that of the transmit signal by a predetermined frequency. Methods further involve mixing the return signal with the receive oscillator signal to produce a mixed receive signal comprising a lower sideband and an upper sideband, and filtering the upper sideband of the mixed receive signal to produce a baseband return signal.

In accordance with various embodiments, a radar apparatus includes an antenna arrangement, a signal generator configured to generate a baseband signal, and a transmit section, coupled to the signal generator and the antenna arrangement, comprising a transmit oscillator operating at a predetermined frequency. The transmit section is configured to generate a transmit signal comprising a mix of the baseband signal and a signal at the predetermined frequency, and to filter a lower sideband of the mixed transmit signal. A receive section is coupled to the antenna arrangement and a sideband filter. The receive section comprises a receive oscillator configured to operate at a frequency offset from that of the transmit oscillator by a frequency greater than or equal to a width of the sideband filter. The receive section is configured to mix a return signal received by the antenna arrangement and a signal produced by the receive oscillator at the offset frequency to produce a mixed receive signal comprising a lower sideband and an upper sideband, and to filter the upper sideband of the mixed receive signal to produce a baseband return signal.

These and other features can be understood in view of the following detailed discussion and the accompanying drawings.

DETAILED DESCRIPTION

Figure 1:
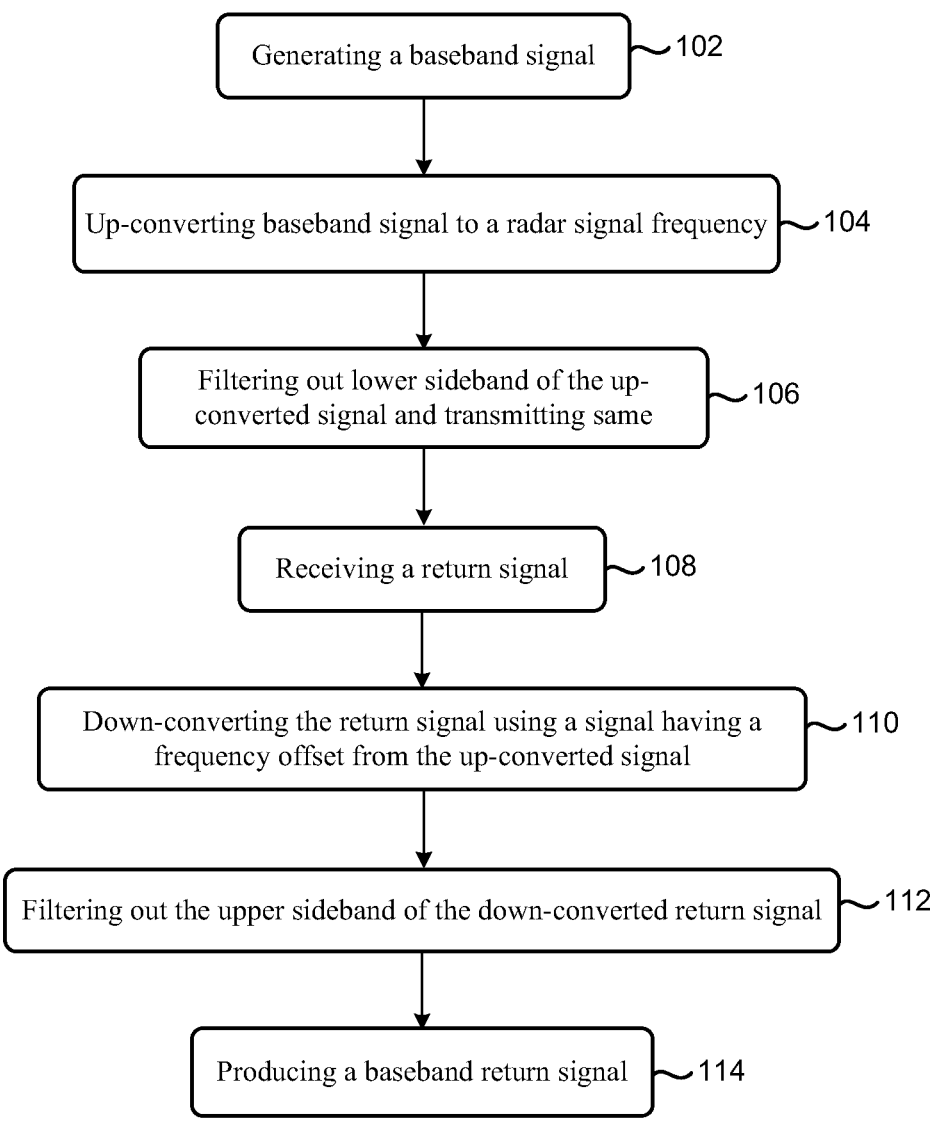
FIG. 1 illustrates various processes of an offset frequency homodyne radar detection method according to various embodiments.

In the following description of the illustrated embodiments, references are made to the accompanying drawings forming a part hereof, and in which are shown by way of illustration, various embodiments by which the invention may be practiced. It is to be understood that other embodiments may be utilized, and structural and functional changes may be made without departing from the scope of the present invention.

Systems, devices or methods according to the present invention may include one or more of the features, structures, methods, or combinations thereof described herein. For example, a device or system may be implemented to include one or more of the useful features and/or processes described below. It is intended that such a device or system need not include all of the features described herein, but may be implemented to include selected features that provide for useful structures, systems, and/or functionality.

Embodiments are directed to an offset frequency homodyne radar and methods of using same. Embodiments are directed to an offset frequency homodyne ground penetrating radar and methods of using same. Various embodiments are directed to an offset frequency homodyne arbitrary waveform radar that can be used in subsurface radar applications. A radar architecture according to various embodiments is that of an arbitrary waveform, frequency domain radar, which provides for increased flexibility in terms of the types of waveforms that can be transmitted. Wideband arbitrary waveform operation according to some embodiments allows tailoring of the transmit waveform to a specific application and/or target, or the operating environment (e.g., noise location in frequency). In addition to an SFCW signal, for example, broader instantaneous frequency signals can be transmitted that may result in higher amplitude responses, collected in shorter times.

Embodiments of the disclosure directed to a small size, low power radar that can be installed on a drill head (e.g., for horizontal directional drilling (HDD) or oil and gas drilling) for use in obstacle detection or general mapping. Embodiments of an offset frequency radar for use on a drill provides for mapping and detection of objects (e.g., obstacles, cavities, geologic contacts, mineralized zones, etc.) during drilling, without the need of a pre-existing bore hole. Embodiments of an offset frequency homodyne radar can be applied to through-the-wall monitoring, among others.

Some embodiments are directed to a wideband arbitrary waveform low power radar system for near range (e.g., <100 m) sensing that utilizes an offset radio frequency architecture to optimize signal quality while at the same time minimizing the required components to implement the system. Embodiments are directed to an offset frequency homodyne radar architecture that, through careful selection of the transmit and local oscillator frequency, utilizes a digitization anti-aliasing filter to attenuate an unwanted transmit sidelobe. The architecture also reduces all transmit harmonics prior to digitization.

A radar architecture according to various embodiments provides for increased hardware simplicity over conventional architectures that results in improved sideband rejection and wide dynamic range, without additional mixing stages required with standard heterodyne radar structures. Embodiments are directed to an improved radar architecture with enhanced sideband suppression using an offset homodyne architecture, which lends itself to the construction of an arbitrary waveform radar with very good noise and sideband suppression, while providing a more inexpensive approach to improve signal quality. An offset frequency homodyne architecture in accordance with various embodiments utilizes an anti-aliasing filter to advantageously reduce sidelobes and transmit harmonics prior to digitization.

The motivation for a second IF frequency in super-heterodyne architectures is to ensure a clean transmit spectrum and as a result a clean receive spectrum; with no harmonics or sub-harmonics that interact with the target and are then mixed down into the same band as the carrier and waveform. However, based on simulations, it seems extremely difficult to space out the radar modulation frequencies such that this occurs. It would be more promising if the resultant baseband spectrum was clean, i.e., no overlapping of different mixing products at baseband. Most conventional wideband arbitrary waveform systems use one or more intermediate frequency stages to sufficiently attenuate the sidelobes to a level that does not affect the performance of the radar system. This both introduces additional components and hence size and power requirements; but also addition of non-linear components that adds noise and harmonics to the system, which makes designing wideband arbitrary waveform systems more complex.

Embodiments of an offset frequency radar system require fewer components than conventional wideband arbitrary waveform radar systems, for the same performance and functionality. In doing so, an offset frequency radar system according to various embodiments allows one to target applications requiring radar sensing but with limited space to house the electronics. For example, embodiments of the disclosure are directed to solving the problem of near range sensors for obstacle avoidance applications, which have limited space requirements for sensor electronics. An offset frequency radar architecture can also be applied to other ground penetrating radar problems ranging from utility location to archeology according to various embodiments. An additional problem that can be addressed is inspection of the vicinity of non-metallic pipes, such as from a location in the pipe (e.g., a pipe pig). By way of further example, an offset frequency radar can be used in short range applications of through-the-wall imaging and rescue operations.

Moreover, embodiments of the disclosure avoid the complexity of a second IF stage required by a super-heterodyne design and splits the local (LO) oscillators into a transmit and receive oscillator that are offset by a frequency greater than or equal to the width of a sideband (e.g., Nyquist) filter of the receiver. This solves the issue of phase jitter by always sampling a reference channel along with the device under test (DUT). In addition, the transmit modulator (e.g., single sideband or SSB) according to various embodiments improves the measurement speed by supporting a larger instantaneous bandwidth according to various embodiments.

Turning now to FIG. 1, there is illustrated various processes of an offset frequency radar detection method according to various embodiments. The method according to FIG. 1 involves generating 102 a baseband signal, up-converting the baseband signal to a radar signal frequency, filtering out 106 a lower sideband of the up-converted signal, and transmitting the filtered up-converted signal. The method also involves receiving 108 a return signal and down-converting 110 the return signal using a signal having a frequency offset from the up-converted signal. The method further involves filtering out 112 the upper sideband of the down-converted return signal, and producing 114 a baseband return signal.

Figure 2:
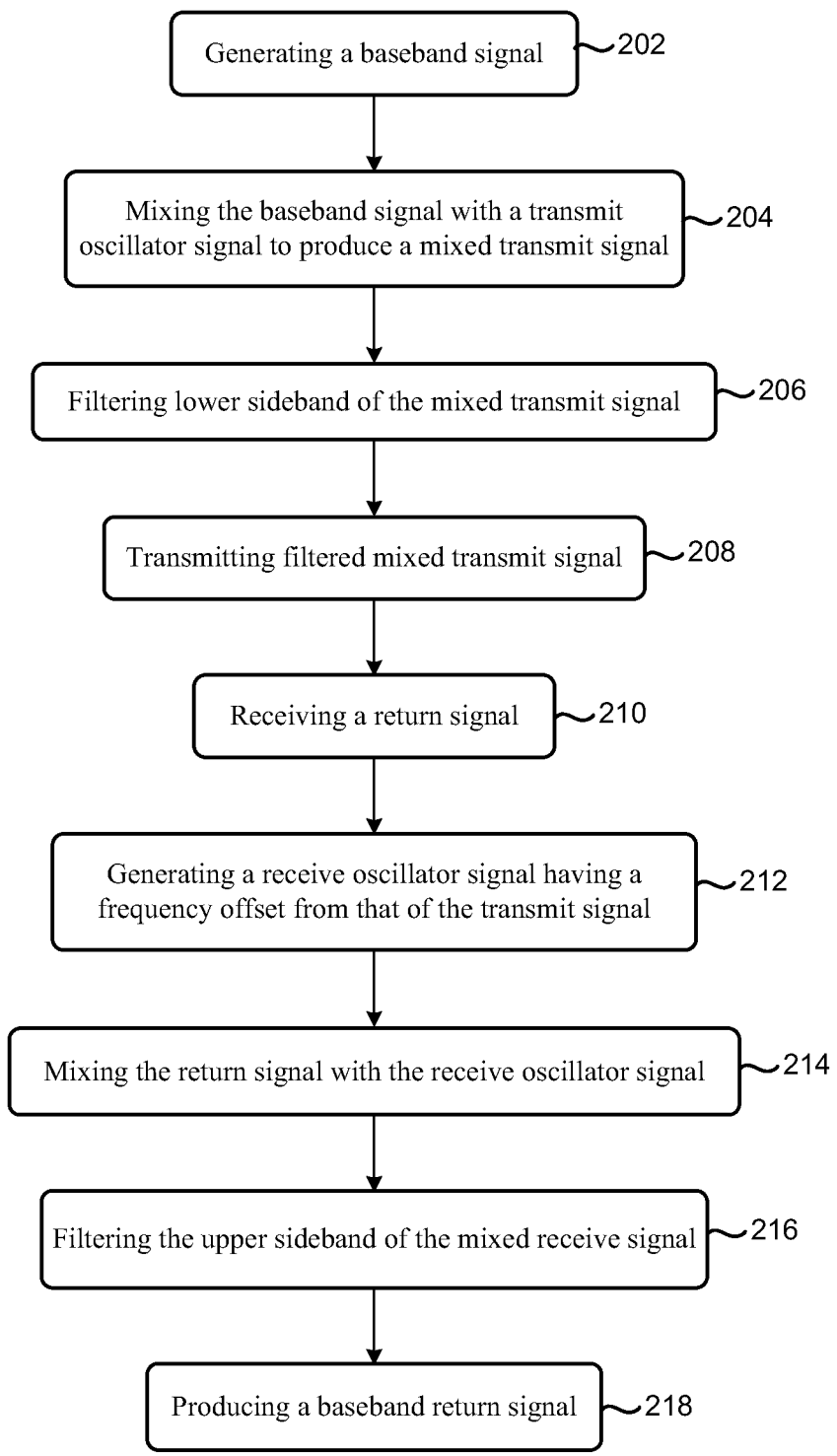
FIG. 2 illustrates various processes of an offset frequency homodyne radar detection method in accordance with various embodiments.

FIG. 2 illustrates various processes of an offset frequency radar detection method according to various embodiments. The method according to FIG. 2 involves generating 202 a baseband signal and mixing 204 the baseband signal with a transmit oscillator signal to produce a mixed transmit signal. The method also involves filtering 206 the lower sideband of the mixed transmit signal and transmitting 208 the filtered mixed transmit signal. The method according to FIG. 2 further involves receiving 210 a return signal, generating a receive oscillator signal having a frequency offset from that of the transmit signal, and mixing 214 the return signal with the receive oscillator signal 214. The method also involves filtering 216 the upper sideband of the mixed receive signal and producing 218 a baseband return signal.

Figure 3:
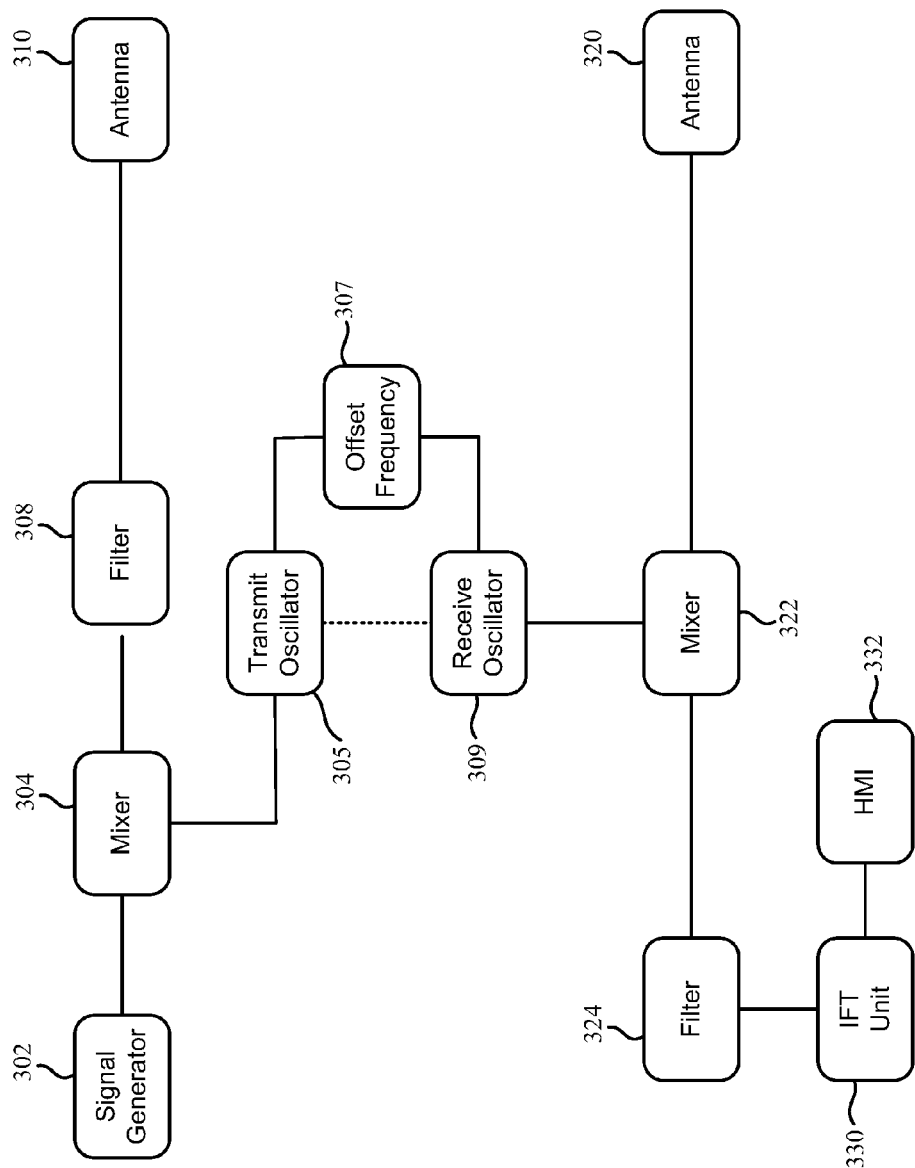
FIG. 3 shows a block diagram of an offset frequency homodyne radar system according to various embodiments.

Referring to FIG. 3, there is shown a block diagram of an offset frequency radar system in accordance with various embodiments. In the embodiments illustrated in FIG. 3, a transmit section of the radar system includes a signal generator 302 configured to generate a baseband signal. The baseband signal produced by signal generator 302 is communicated to a transmit mixer 304 which is configured to mix the baseband signal and a carrier signal generated by a transmit oscillator 305. The mixed transmit signal output from the transmit mixer 304 is received by a filter 308, which is configured to attenuate an unwanted transmit sidelobe of the mixed transmit signal. For example, the filter 308 is configured as a lowpass filter that filters higher order harmonics of the mixed transmit signal. The filtered mixed transmit signal (e.g., the upper sideband of the mixed transmit signal) is communicated to an antenna arrangement comprising a transmit antenna 310.

A receive section of the radar system illustrated in FIG. 3 includes a receive oscillator 309 coupled to the transmit oscillator 305. The receive oscillator 309 is configured to operate at a frequency offset from that of the transmit oscillator 305 by a predetermined frequency. According to some embodiments, the receive oscillator 309 is configured to operate at a frequency offset 307 from that of the transmit oscillator 305 by a frequency greater than or equal to a width of a sideband filter 324 of the receive section. The receive section also includes a receive mixer 322 coupled to a received antenna 320 of the antenna arrangement. The receive mixer 322 is configured to mix a return signal received by the receive antenna 320 and a signal produced by the receive oscillator 309 at the offset frequency 307.

Mixing the return signal and the receive oscillator signal at the offset frequency effectively flips the return signal (e.g., a return of the upper sideband of the mixed transmit signal) into the lower sideband of the mixed return signal. The sideband filter 324, which is preferably a Nyquist filter, is configured to attenuate the unwanted upper sideband of the mixed return signal. The filtered mixed return signal is then digitized and processed to construct a time-domain signal or pulse (e.g., a time domain trace). For example, the filtered mixed return signal is digitized and processed by an inverse Fourier transform unit 330. The time-domain signal output from the inverse Fourier transform unit 330 can be communicated to a human-machine interface (HMI) 332 for displaying the processed return signal.

In some embodiments, the radar system shown in FIG. 3 is implemented as a stepped-frequency continuous wave (SFCW) radar. According to such embodiments, the frequency of the carrier signal generated by the transmit oscillator 305 is incremented to each of a plurality of disparate frequencies, such as evenly spaced or unevenly spaced discrete frequencies within a sweep frequency range (e.g., 800 to 900 MHz, at 4 or 8 MHz steps). As the transmit oscillator frequency changes, so does the receive oscillator frequency. At each frequency step, the offset frequency 307 is maintained between the transmit and receive oscillator frequencies. The up-converting and down-converting processes discussed above are repeated for each frequency step. The HMI 332 receives a time-domain signal or pulse at each frequency step of the sweep frequency range. These time-domain signals are buffered or stored and displayed on display of the HMI 332. In some embodiments, the signal generator 302 produces a baseband signal having a single frequency. In other embodiments, the signal generator 302 produces a baseband signal having a multiplicity of frequencies or frequency packets, such as 2, 3, 4, 5, or 6 frequencies, which may be evenly or unevenly spaced. In such embodiments, the multi-frequency baseband signal is processed concurrently for all frequencies by the components shown in FIG. 3.

Figure 5A:
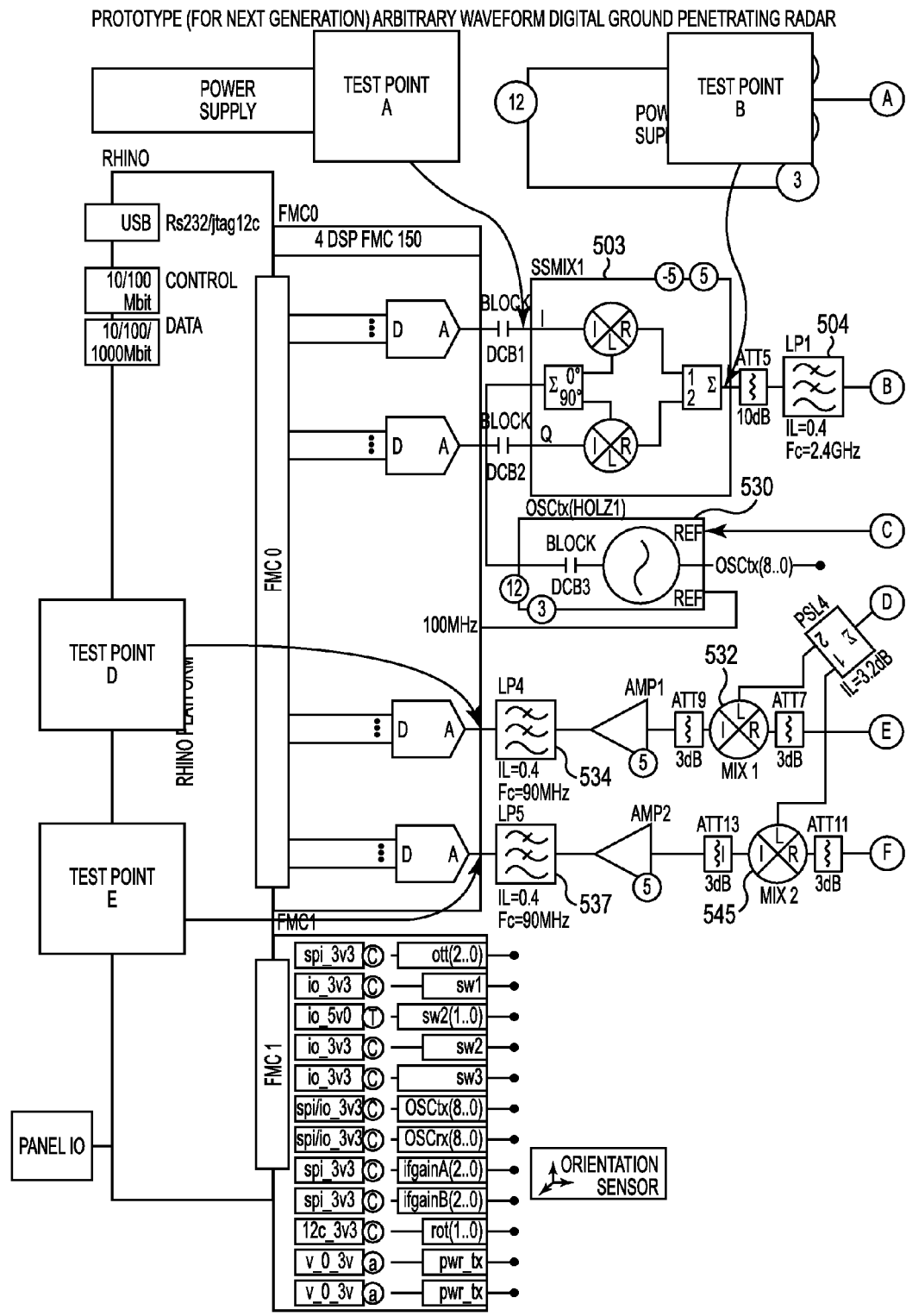
FIGS. 5A-5B is a block diagram of an offset frequency homodyne radar system in accordance with varioue embodiments.
Figure 5B:
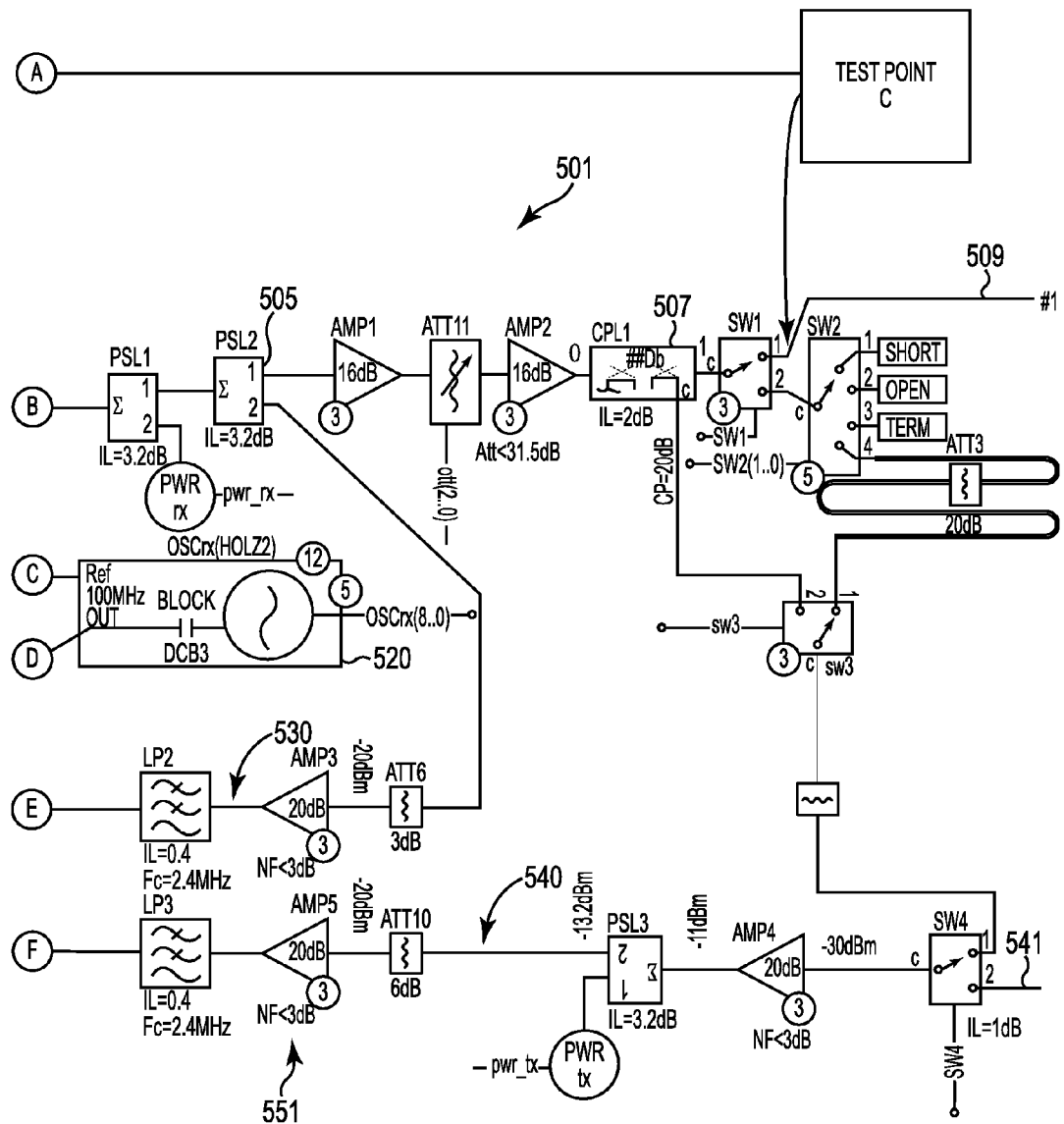

FIGS. 5A-5B is a block diagram of an offset frequency homodyne radar system in accordance with varioue embodiments. In the block diagram of FIG. 5, a number of test points (A-E) are shown, waveforms for which are illustrated in FIGS. 6-10. The radar system illustrated in FIG. 5 includes a transmit section 501 and a receive section 551. Among other components, the transmit section 501 includes a transmit quadrature mixer 503 coupled to a lowpass filter 504, which generally correspond to the mixer 304 and filter 308 described previously with regard to FIG. 3. A transmit oscillator 530 is coupled to the input of the transmit mixer 503. The transmit section 501 also includes a coupler 505 which splits the filtered mixed transmit signal for communciation to a transmit antenna 509 and to a receive reference or calibration branch 530 of the receive section 551.

The receive reference branch 530 includes a receive quadrature mixer 532 and a lowpass filter 534, which is preferably configured as a Nyquist filter. A receive oscillator 520 is coupled to the receive mixer 532, and is offset to the frequency of the transmit oscillator 530 by a predetermined amount, such as 100 MHz in this illustrative embodiment. The receive quadrature mixer 532 and the lowpass filter 534 generally correspond to the mixer 322 and filter 324 described previously with regard to FIG. 3. Sampling of the receive reference branch 530 along with the receive signal branch 540 (e.g., device under test) is used to solve problems associated with phase jitter. The receive section 551 includes a receive antenna 541 which is coupled to a receive mixer 545 and a lowpass filter 547, which is preferably configured as a Nyquist filter. A coupler 507 is provided to provide connectivity between the transmit section 501 prior to the transmit antenna 509 and the receive signal branch 540 of the receive section 551 for performing various diagnostics, such as S11 (TX) and S21 calibration.

Figure 6:
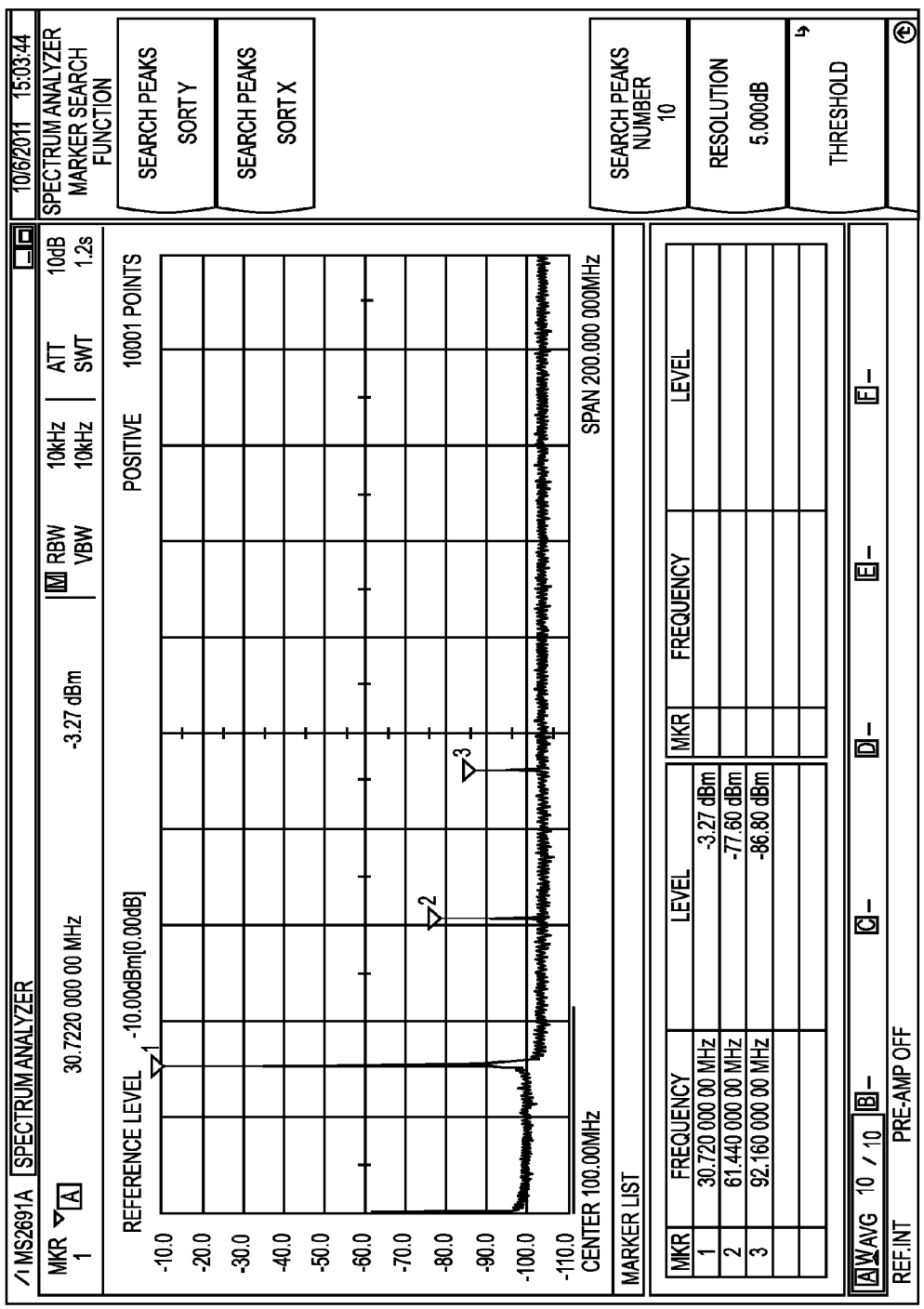
FIGS. 6-10 show waveforms present at a number of test points (A-E) shown in FIG. 5.
Figure 7:
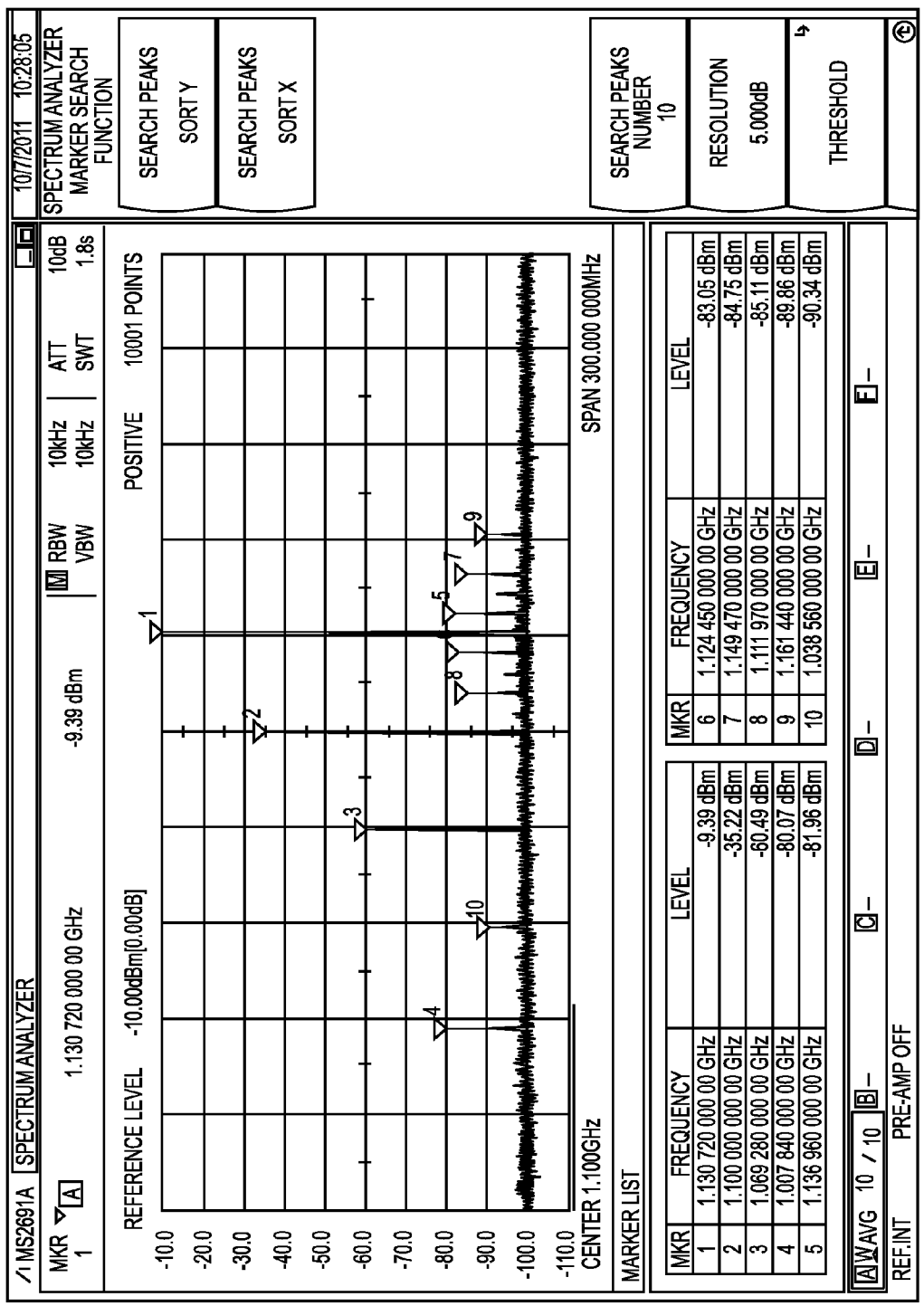
Figure 8:
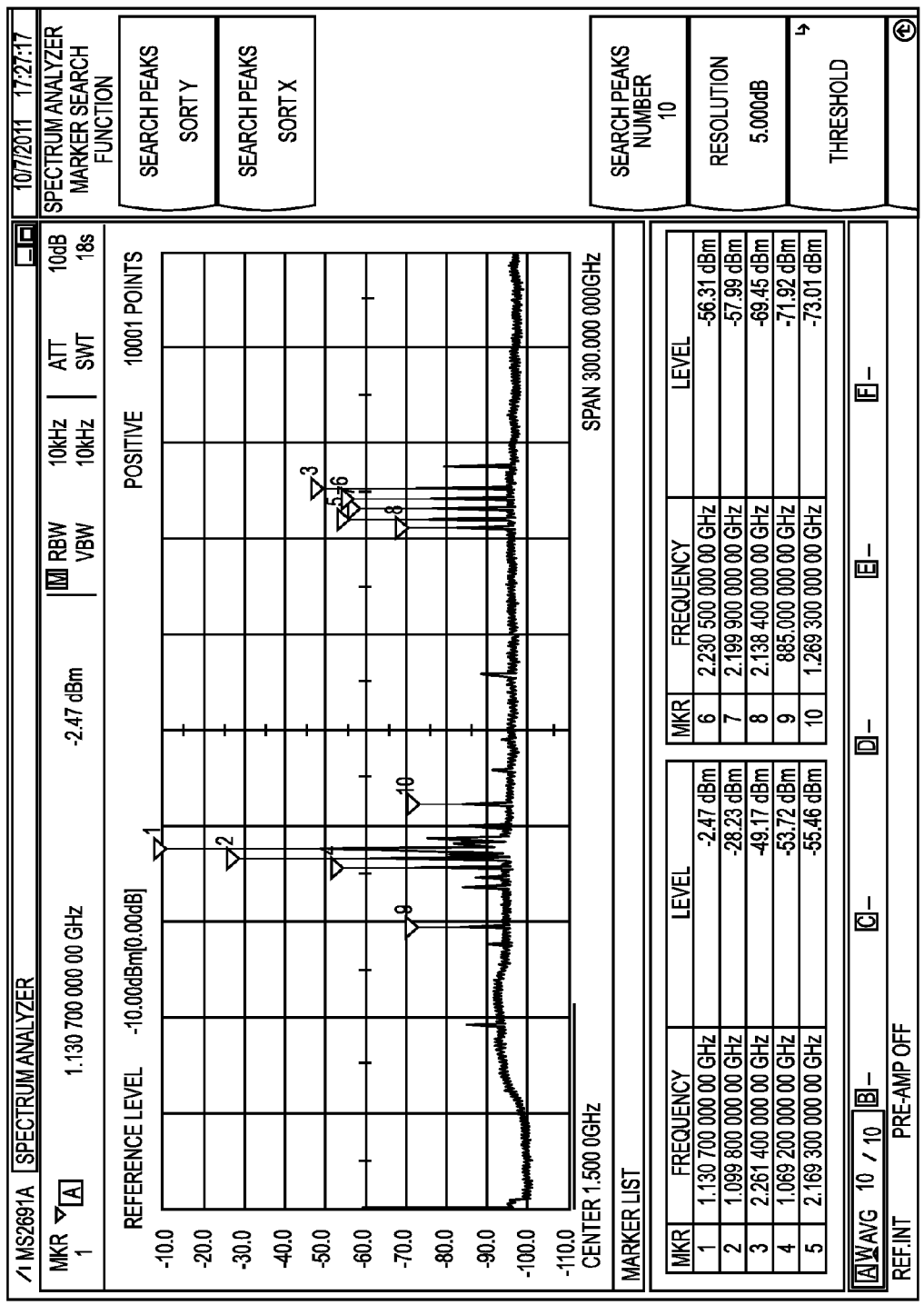
Figure 9:
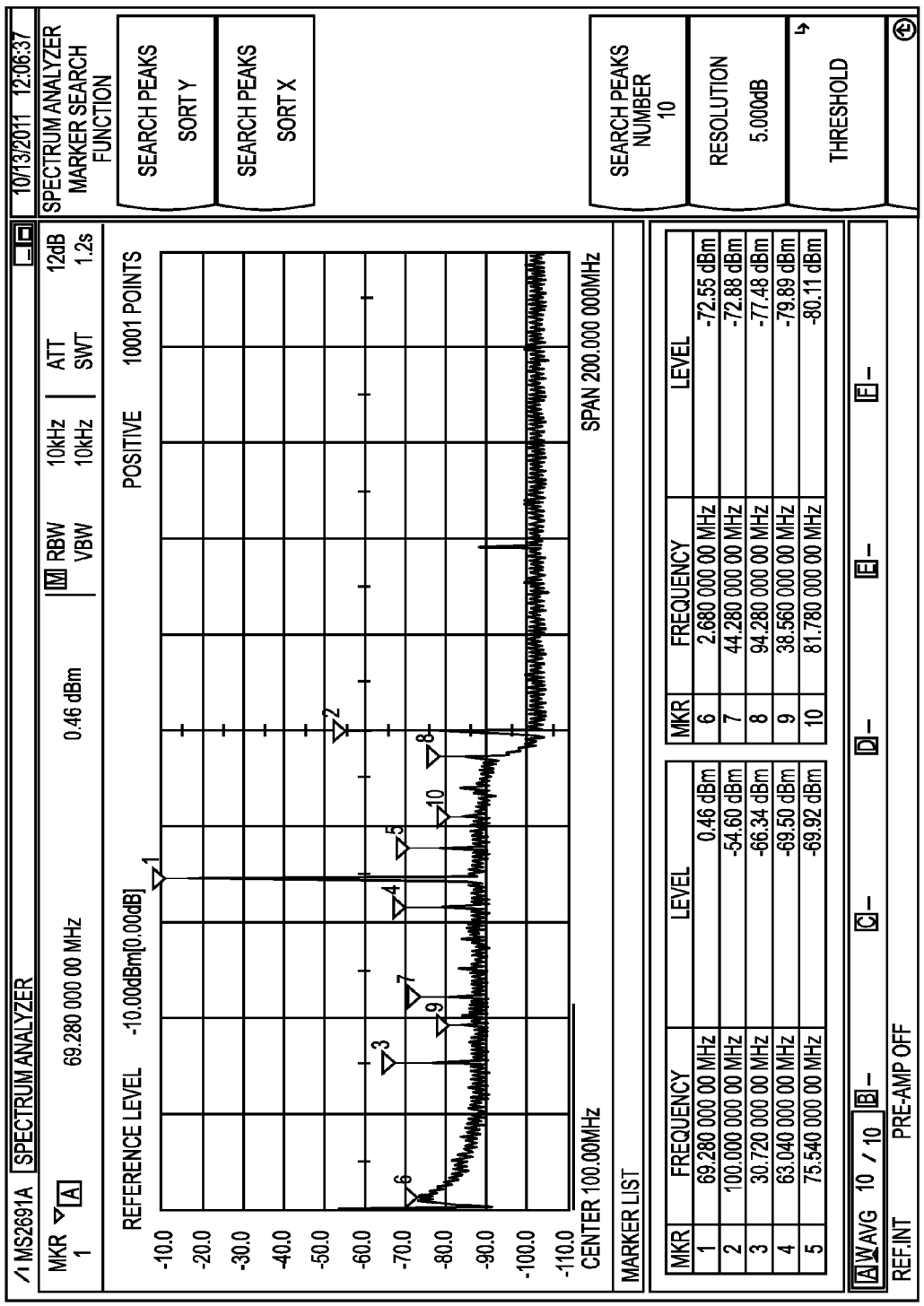
Figure 10:
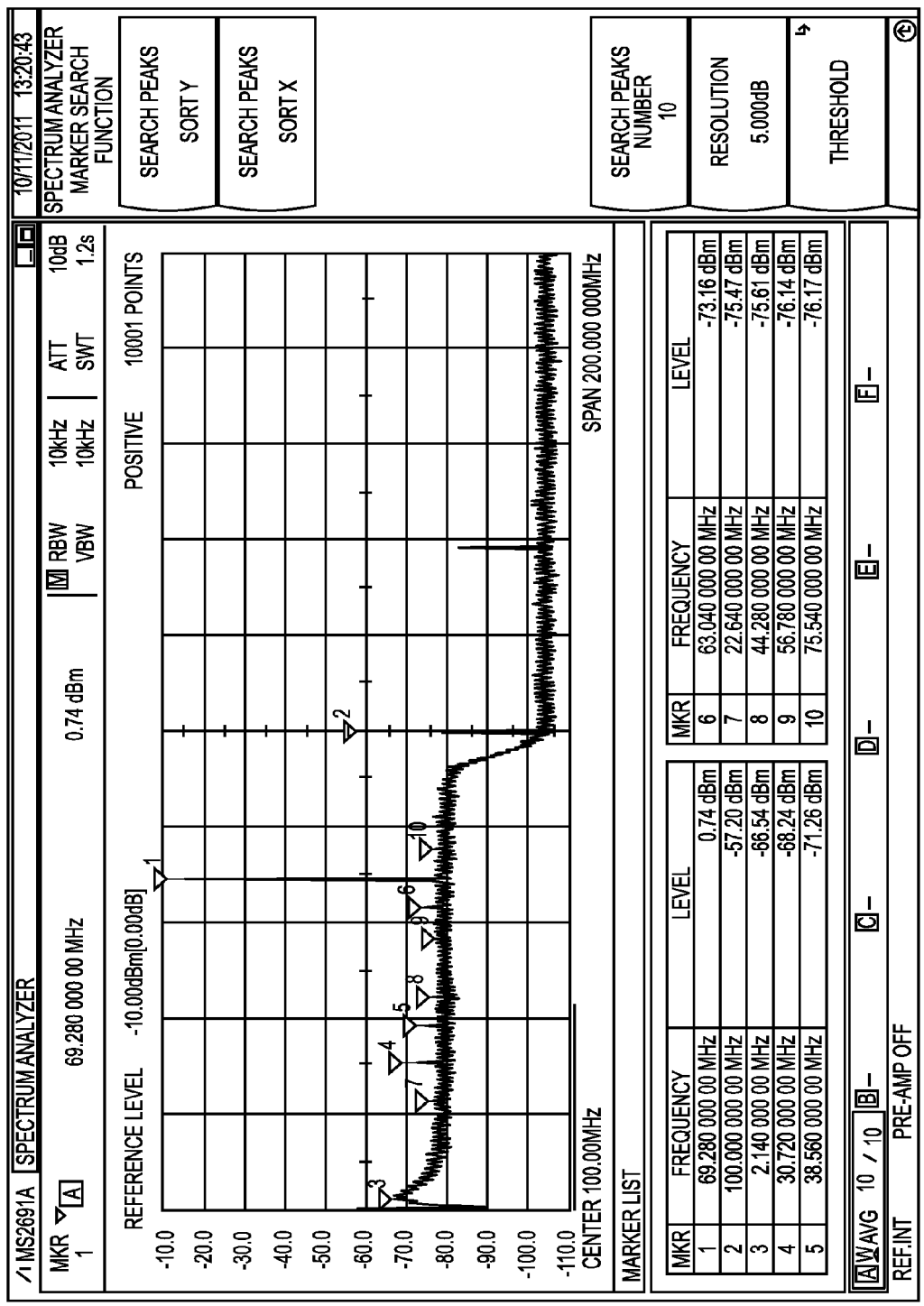

As the RF chain is fed with a sinusoidal waveform produced by a signal generator and communicated to the transmit mixer 503, the resulting signal at each of test points A-E was measured on a spectrum analyser and compared to simulations discussed previously. In FIG. 6, the output from a digital-to-analog convertor (DAC) that is fed into the RF chain beginning at transmit mixer 503 at test point A is shown. In this illustrative example, the frequency of the signal is 30.720 MHz. The signal is clean, with the second and third harmonics at less than −75 dBm. After mixing with the transmit LO operating at 1.1 GHz, the signal is now at 1.13072 GHz, as shown in FIG. 7. Other than the oscillator frequency at 1.1 GHz and the lower sideband at 1.06928 GHz, all other harmonics are at less than −80 dBm. Test point C (FIG. 8) shows the output RF signal that will be transmitted by the transmit antenna 509. There are several harmonics and intermodulation products present. However, due to the offset frequency of the receive LO, few mix back down to the radar baseband. Test points D and E (FIGS. 9 and 10) show the output of the RF chain on the receive section 551 of the radar, as it is ready to be digitized for further processing. The radar band signal has been flipped into the lower side band at 69.28 MHz (1200 MHz minus 1130.72 MHz), and other noise components are not significantly mixed into the radar base band. Other than a peak at 100 MHz from the offset frequency, other peaks are at amplitudes of less than −65 dBm. There is a low frequency peak in these results that comes from the IF amplifier at about 2.6 MHz. This peak can be reduced with a high pass filter.

The dual receive channels of the receive section 551, with one reference channel 530 and one DUT channel 540, supports removal of phase errors. Internal calibration of the radar can be implemented in this design. For example, both S11 (TX) and S21 measurements can be provided, with a more complete on-the-fly tuning of the radar to its surroundings. This can increase the SNR through optimum waveform design.

The offset frequency homodyne radar architecture lends itself to function as an arbitrary waveform radar according to various embodiments, as was discussed previously. First, an offset frequency homodyne radar can be operated as a SFCW system, where one frequency packet is transmitted for each setting of the transmit local oscillator. The next step in this example is to transmit several frequencies (offset from each other by a constant interval) in each transmit LO setting. In this case, an equivalent SFCW waveform is transmitted, but with several frequencies sent per transmit LO setting. Thus, there are fewer transmit LO settings per radar trace and measurement speed is increased by a factor equal to the number of frequencies transmitted per step. This operation is possible because the passband of the Nyquist filter is 20-100 MHz rather than a very narrow filter according to various embodiments. Other waveforms can as easily be transmitted by mixing with the transmit LO, such as FMCW, stepped FMCW, noise, and coded signals. For each waveform transmitted, the DAC of the signal generator that controls waveform generation is only coded and set once. The range of frequencies to be transmitted is varied by changing the transmit LO frequency in a limited number of steps. Thus, an arbitrary waveform can be built-up piecewise, resulting in faster radar trace collection.

EXAMPLE 1

Figure 4:
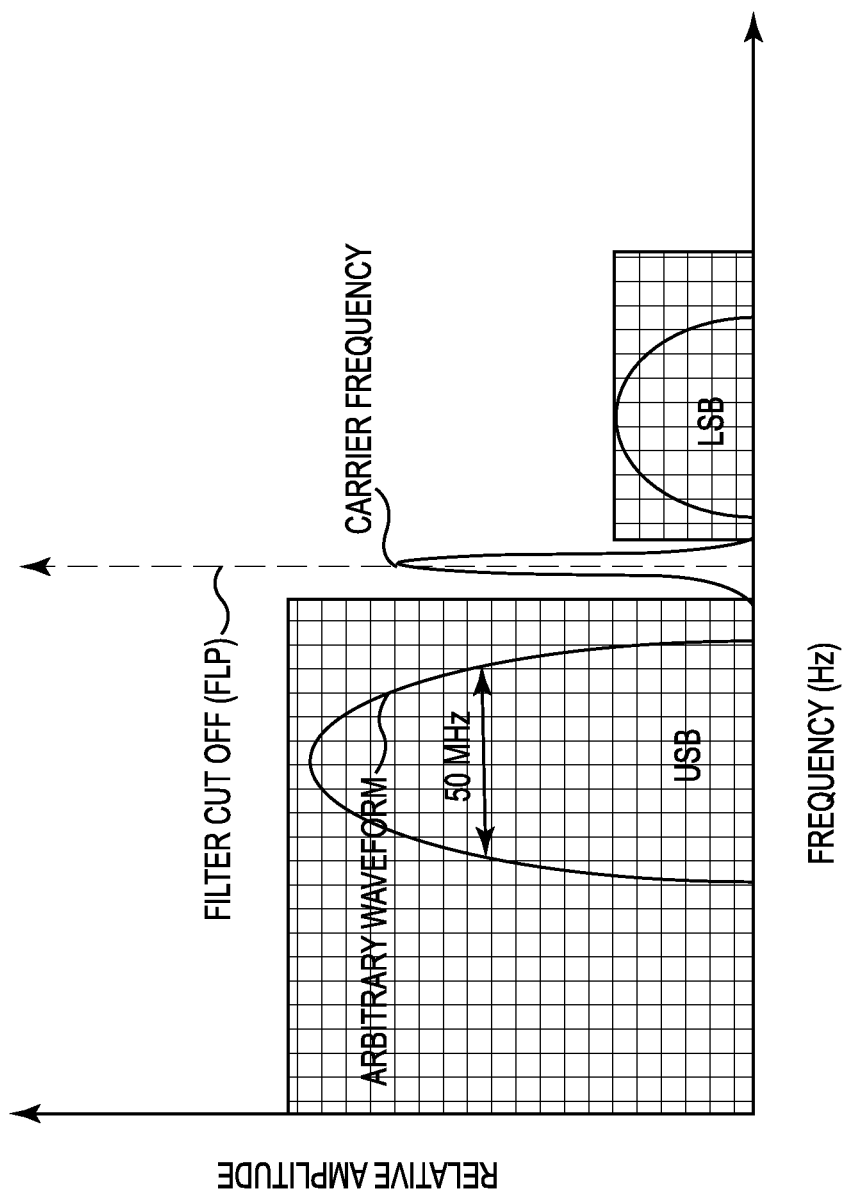
FIG. 4 illustrates a down-converted spectrum for an offset frequency homodyne radar according to various embodiments.

The following representative example illustrates aspects of an offset frequency homodyne radar detection implementation in accordance with various embodiments. In the following example, reference is made to the plot of FIG. 4, which illustrates the down-converted spectrum for an offset frequency homodyne radar according to various embodiments. If a measurement bandwidth of 100 MHz is assumed, then the receive oscillator LO will be defined such that $F\_rxLO=F\_txLO+100$ MHz, where $F\_rxLO$ is the LO frequency of the receive oscillator, $F\_txLO$ is the LO frequency of the transmit oscillator, and 100 MHz is the frequency offset between the receive and transmit oscillators. It is desirable to design the digital waveform of the baseband signal produced by the signal generator such that its maximum frequency is close to 100 MHz, which will result in the transmitted waveform being mixed down to baseband, with its lowest frequency closest to the edge of the low pass Nyquist filter. In addition, the LSB is above the filter cutoff and is hence further attenuated.

In this representative example, assume that a single 30 MHz signal is mixed with the transmit LO at 800 MHz. After the IF filter, a frequency of 830 MHz goes to both the transmit antenna and the receive section, which can include a calibration branch. The 830 MHz is then modulated with the receiver LO at 900 MHz, giving 1730 MHz and 70 MHz. The upper side band is easily filtered, and the down-converted lower side band of 70 MHz passes on to be digitized and processed. An interesting aspect of this design is that the upper sideband that was transmitted has now been flipped into the lower sideband and filtered by the 100 MHz Nyquist filter, as is shown in FIG. 5.

To verify the efficacy of an offset frequency homodyne radar detection implementation in accordance with various embodiments, the RF system was simulated in Genesys using the Spectrasys tool. The results for the frequency domain simulation were plotted. A plot of power as a function of frequency for all the harmonic and intermodulation products for the transmit waveform showed many harmonics and intermodulation products. However, since the transmit and receiver LO are offset, most of these signals do not mix down to the baseband of the radar. The only unwanted mixing products were more than 80 dB below the desired signal. The results for a transmit waveform consisting of 5 CW signals spaced 8 MHz apart were also plotted. One plot showed that the 5 CW signals are cleanly mixed down to below 100 MHz while the various intermodulation products are mixed to frequencies greater than 100 MHz. After filtering with the Nyquist low pass filter, the unwanted signals were completely removed, as was shown in another plot.

Embodiments of an offset frequency homodyne radar has significant potential benefits. First, an offset frequency homodyne radar takes advantage of advances that have been made in hardware components. These include higher density FPGA chips, faster ADC chips, and better communications devices. By changing the design to have an intermediate frequency (IF) of 20-100 MHz, for example, a broader frequency span can be used in less time. Thus, measurement speed is increased.

Figure 11:
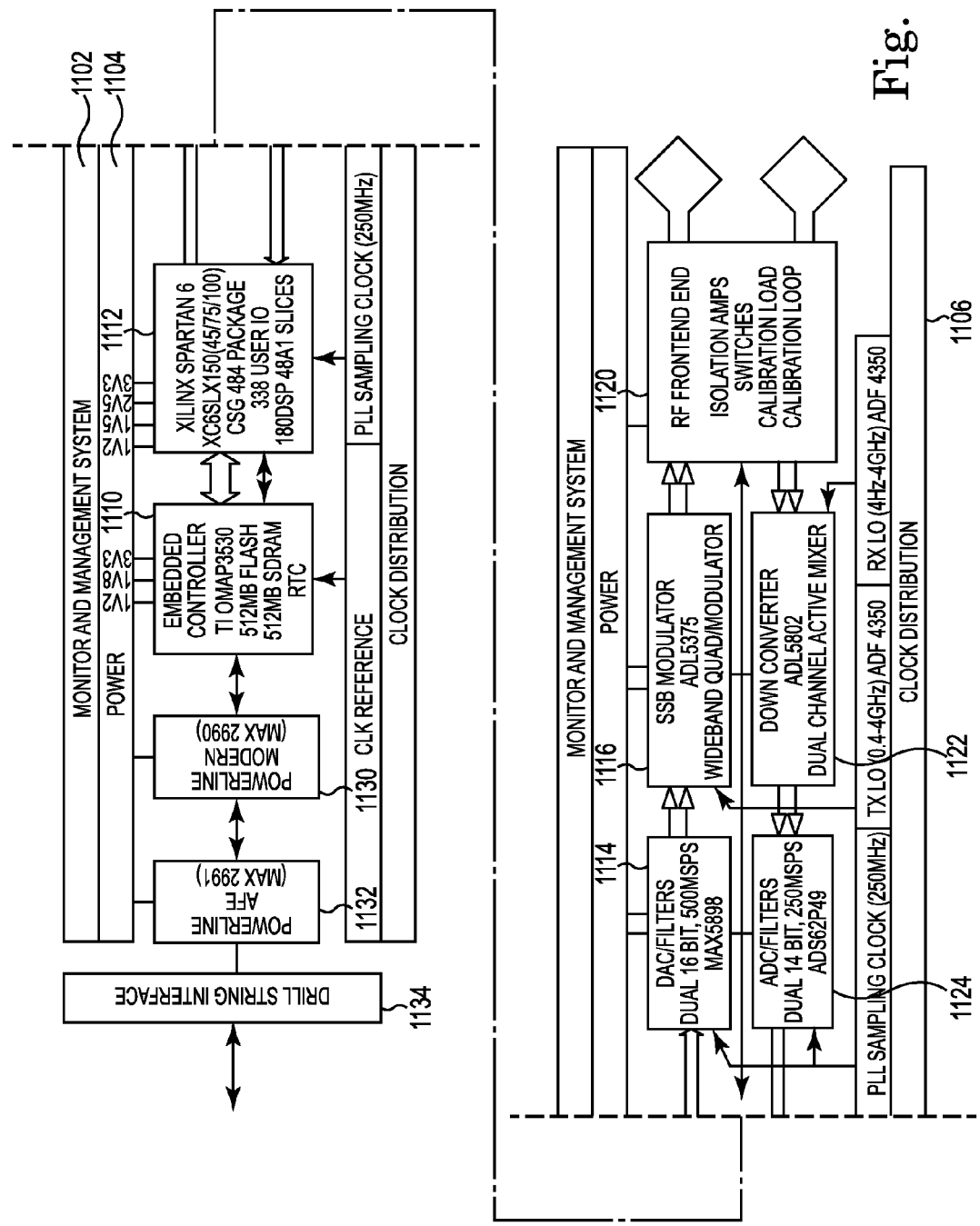
FIG. 11 shows a block diagram of an offset frequency homodyne drill head radar in accordance with various embodiments.

FIG. 11 shows a block diagram of an offset frequency homodyne drill head radar in accordance with various embodiments. The block diagram of FIG. 11 shows a basic radar design implemented using currently available mobile phone and communications technology. In some embodiments, the radar shown in FIG. 11 is implemented on a multi-layer circuit board (e.g., 14 or more layers) having dimensions of about 1 inch by 14 inches, and configured for operation in a drill head. The radar illustrated in FIG. 11 includes a monitor and management system 1102, a power system 1104, and a clock distribution system 1106. Coupled to these systems are a number of components, including an embedded controller 1110 (such as the TI OMAP 3530) coupled to an FPGA 1112 (such as the Xilinx Spartan 6). Coupled to the FPGA 1112 are DACs/filters module 1114, an SSB modulator 1116, and an RF front end 1120. The RF front end 1120 includes transmit and receive antennae, isolation amplifiers, switches, a calibration load, and a calibration loop. Also coupled to the RF front end 1120 is down convertor 1122 and ADCs/filters module 1124. Shown coupled to the embedded controller 1110 are drill string power components, including a power line modem 1130 and a power line AFE 1132. These drill string power components are coupled to a drill string interface 1134.

The homodyne drill head radar embodiment shown in FIG. 11 has the advantage of fewer components, resulting in a simpler system to implement with a smaller form factor. The radar shown in FIG. 11 utilizes the same processor found in most mobile phones; a high performance low power ARM Cortex A8 based processor, which occupies less space than earlier version embedded systems, but is capable of running a Linux operating system. In some embodiments, a separate embedded ARM Cortex A8 processor (such as the TI OMAP 3530) or alternatively one could use the Xilinx 28 nm Zynq platform, which integrates a dual core ARM Cortex A9 with a Virtex 7 FPGA fabric. Linux is exceptionally well supported on this platform and greatly simplifies the maintenance of the software systems for the radar. The great advances in FPGA technology allows for the use of a single device for a fraction of the cost of earlier devices. In addition, the FPGA interfaces to an embedded controller to allow for in-situ reconfiguration of the FPGA via the embedded processor. To simplify the software interface between the processor and FPGA, the processor is configured to run a variant of Linux called Borph (Berkeley Operating system for ReProgrammable Hardware). This also allows use of excellent monitoring and control software developed as part of the CASPER collaboration at the University of California, Berkeley.

The RF components in the radar system have also benefited from technological advances in the telecommunication industry. High speed ADCs and DACs with high linearity (16 bits) can be used to generate and capture the radar waveforms. Integrated, small wireless chips can be used to perform the modulation, filtering, calibration and antenna interfacing. Most devices support two signal paths, thus reducing the number of devices needed to implement the system and hence the size of the system. Synthesizers now include VCOs and make the design and implementation of low noise RF sources straightforward. In addition there are many wide band quadrature modulators and dual wideband mixers with integrated LO drive amplifiers available from numerous vendors.

Figure 12:
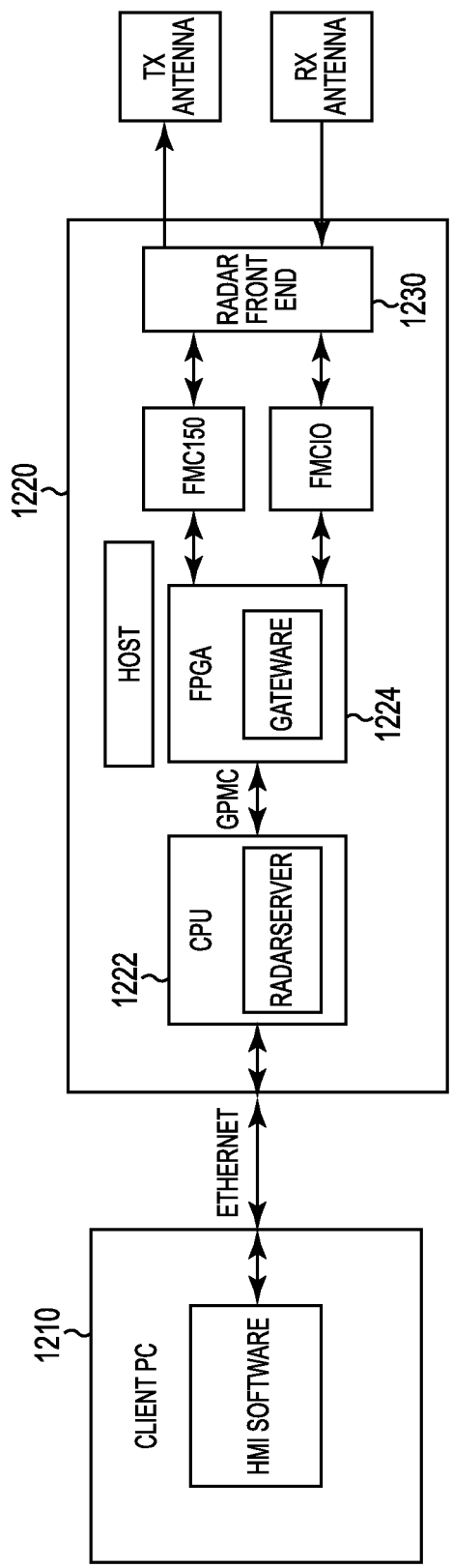
FIG. 12 shows the general structure of an offset frequency radar interface in accordance with various embodiments.

FIG. 12 shows the general structure of an offset frequency radar interface in accordance with various embodiments. The downhole components 1220 include a CPU 1222, an FPGA 1224, DAC/ADC, control of switches and interfaces, and the radar front end 1230. The CPU 1222 includes a downhole ARM processor, such as an ARM 8 coprocessor. The CPU 1222 runs the Radarserver functions and provides high level commands to the FPGA 1224. In turn, the FPGA 1224 sends register level commands to the separate devices, such as the DAC/ADC. Processing blocks can exist on both the separate Client PC 1210 (uphole device) and on the remote CPU 1222. However, this processing can exist on any of the three devices; client PC 1210, CPU 1222, or FPGA 1224.

Figure 13A:
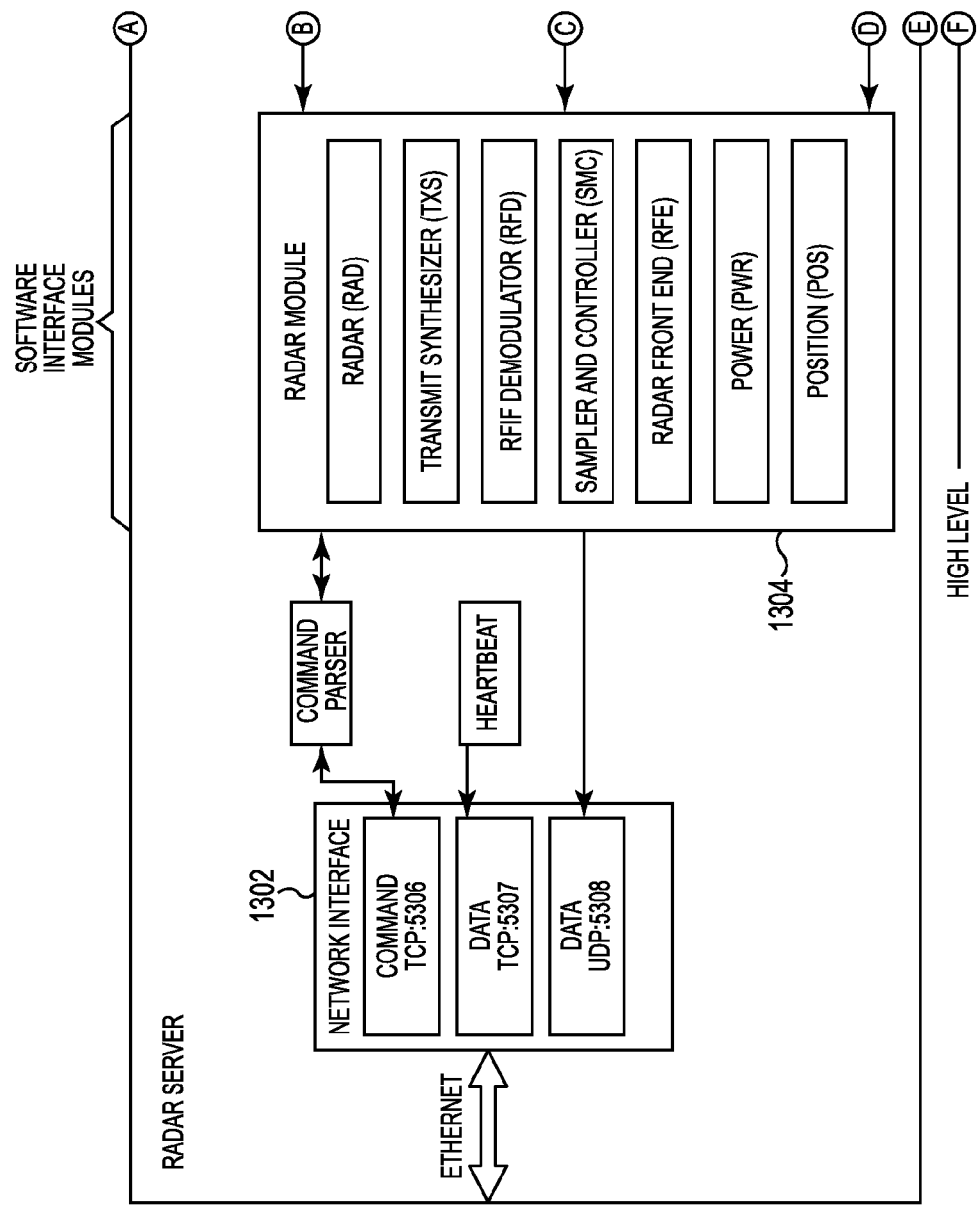
FIGS. 13A-13B is a block diagram of the Radarserver architecture of an offset frequency homodyne radar in accordance with various embodiments.
Figure 13B:
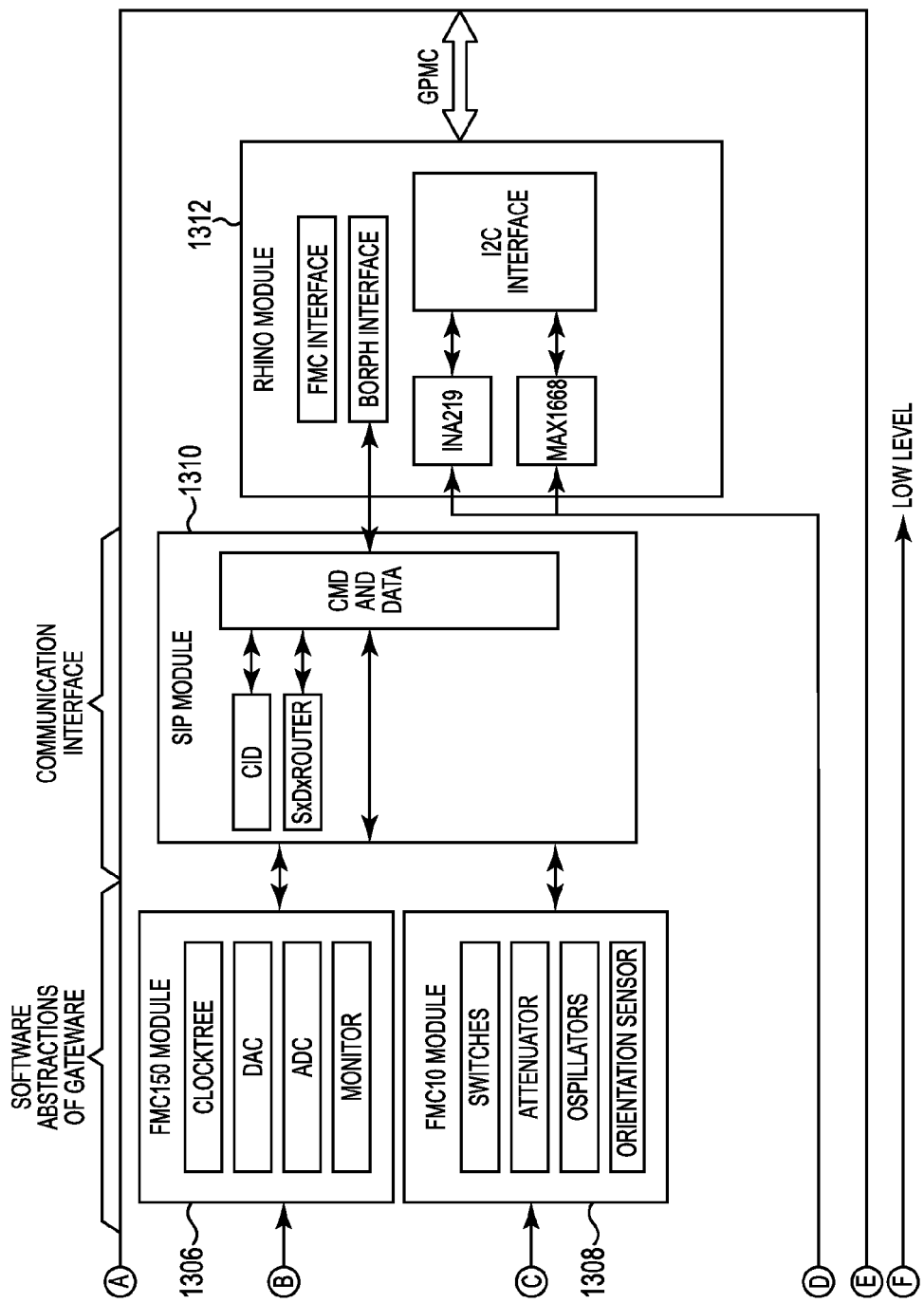

FIGS. 13A-13B is a block diagram of the Radarserver architecture of an offset frequency homodyne radar in accordance with various embodiments. The Radarserver, as shown in FIG. 13, provides the software interface that delivers the high level commands to the FPGA shown in FIG. 12. As illustrated in FIG. 13, the Radarserver comprises a Network/Command Interface 1302, a Radar Module 1304, an FMC150 module 1306, an FMCIO module 1308, a SIP module 1310, and a Rhino module 1312. The Network/Command Interface 1302 provides the command parser that communicates with the surface via an Ethernet wireline. The Radar module 1304 provides the software interface modules for the various sections of the radar including the transmit synthesizer, RF demodulator, power, and position sensor. Some of these functions, specifically the RF demodulator that produces the in-phase and quadrature components of the radar signal, that are currently on the CPU can be migrated to the FPGA. The FMC150 module 1306 and FMCIO module 1308 provide software abstractions of gateware controlling the DAC, ADC, switches, oscillators, and attenuators. This provides the high level configuration of these devices. The SIP module 1310 provides the command interface to the stellar IP core of the gateware.

Figure 14:
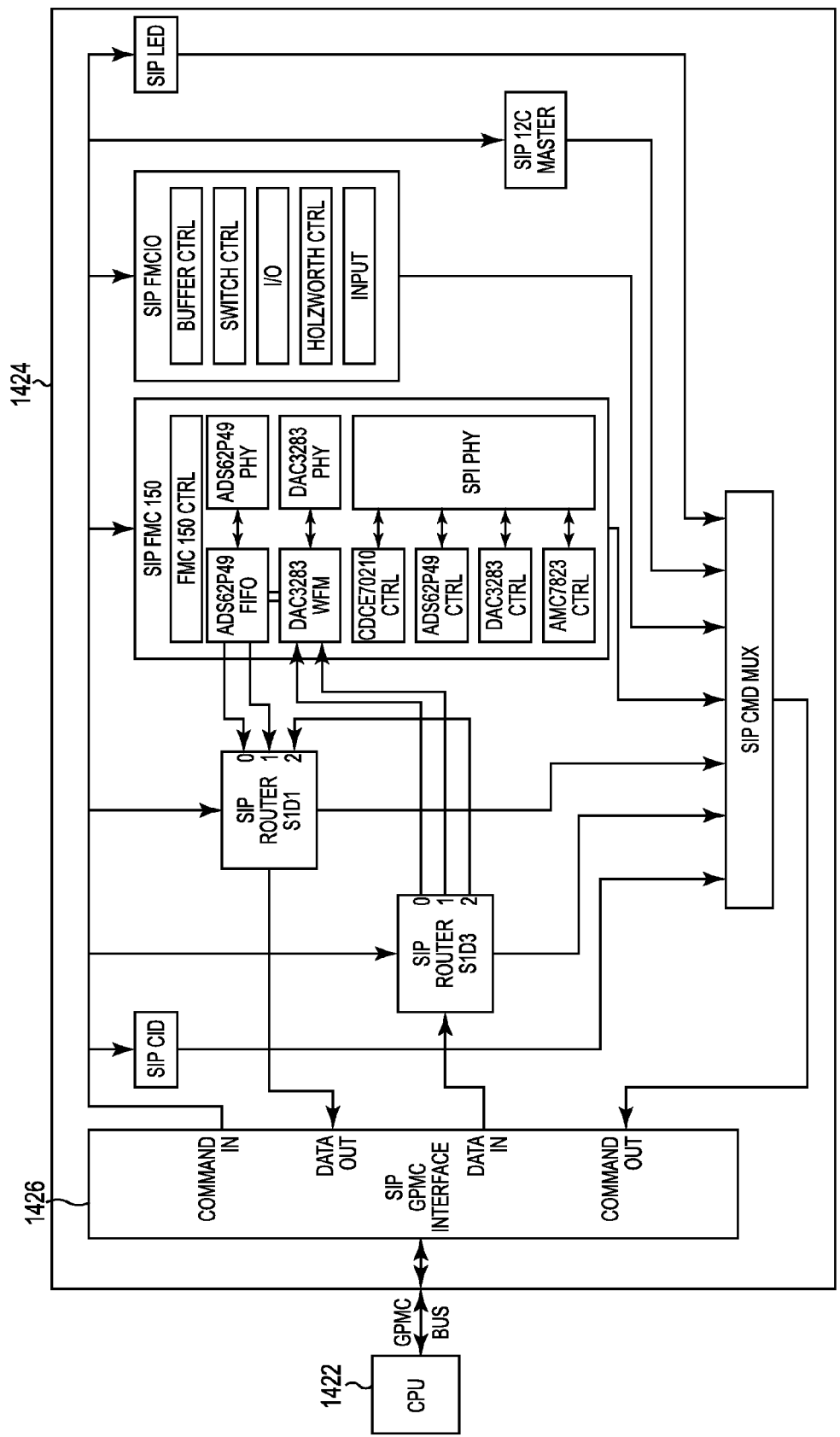
FIG. 14 is a block diagram of the Gateware architecture of an offset frequency homodyne radar in accordance with various embodiments.

The Borph interface of the Rhino module 1312 to the FPGA is performed on the CPU, such as CPU 1422 shown in FIG. 14. FIG. 14 is a block diagram of the Gateware architecture according to some embodiments. Borph provides the means of real time adaptive programming of the FPGA 1424. In some implementations, much of the radar processing (including SAR, complex detection algorithms, and real time adaptive signal variations) can be performed on the FPGA 1424 via the Borph interface. Through the Gateware structure shown in FIG. 14, the FPGA 1424 sets the bits and registers on the DAC/ADC and other devices that actually transmit and receive the radar data. The GPMC interface 1426 provides commands that control the DAC/ADC and RF chain devices, return commands via the command out port, and supply data in and data out ports. The Gateware resides on the FPGA 1424.

Figure 15:
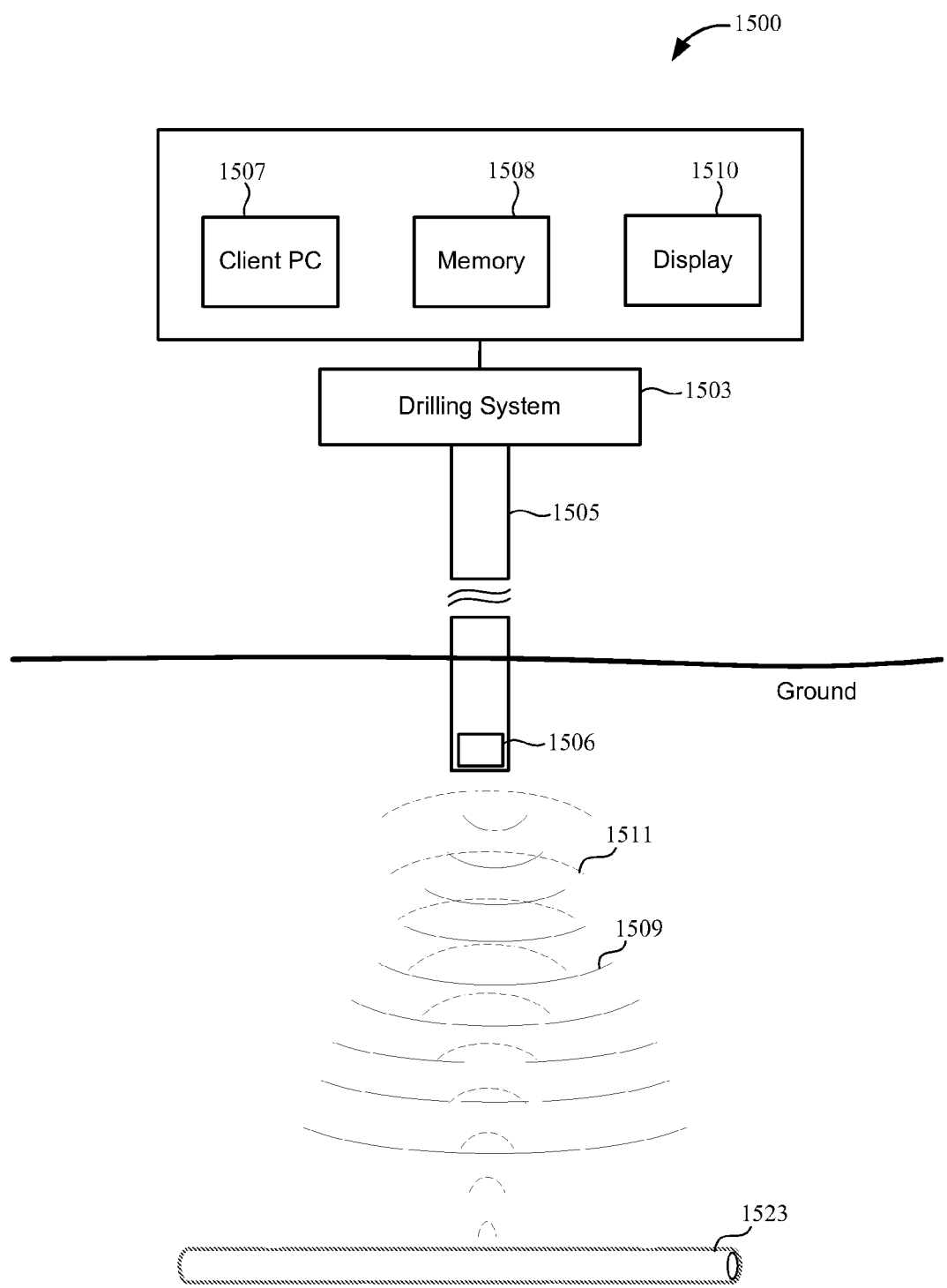
FIG. 15 shows a block diagram of a system for imaging underground objects using an offset frequency homodyne radar according to various embodiments.

With reference to FIG. 15, this figure shows a block diagram of a system 1500 for imaging underground objects using an offset frequency homodyne radar according to various embodiments. The embodiment shown in FIG. 15 represents a system for imaging a subsurface for the presence of buried objects, such as utilities and manmade or natural obstacles, while drilling. According to some embodiments, the system 1500 includes a drilling system 1503 which includes a drill string 1505 to which a sensor 1506 is attached. The sensor 1506 includes a downhole offset frequency homodyne radar, such as that shown in FIG. 12. The drilling system 1503 includes a rotation unit configured to rotate the drill string 1505 and a displacement unit configured to longitudinally displace the drill string 1505. A processor 1507 is coupled to the rotation and displacement units and configured to coordinate sampling, by the sensor 1506, of subsurface surrounding the sensor 1506 while rotating and displacing the drill string 1505. According to some embodiments, the sensor 1506 is configured to transmit a radar probe signal 1509 that propagates through the subsurface and impinges on or illuminates an underground object, in this case a utility 1523. Interaction between the utility 1523 and the probe signal 1509 results in a return signal 1511 that is detected by the sensor 1506.

Horizontal directional drilling provides numerous advantages over the historical trench based techniques for subsurface utility installation. However, HDD does suffer from the constant threat of striking unknown, unmapped, or mis-located utilities and other obstacles. Striking these obstacles can cost the operator revenues, for repairs, or in more serious cases result in loss of equipment, injury, or death. Thus, there is a need for sensors that can be mounted on the drill head that detect obstacles far enough in advance to allow the drill operator to detect and/or map them. An offset frequency homodyne drill head radar incorporated into an HDD machine provides for enhanced detecting and/or mapping of obstacles to allow their avoidance, which is of great importance, especially when damaging one of these features could result in disruption of utility service or possible contaminant release.

Figure 16:
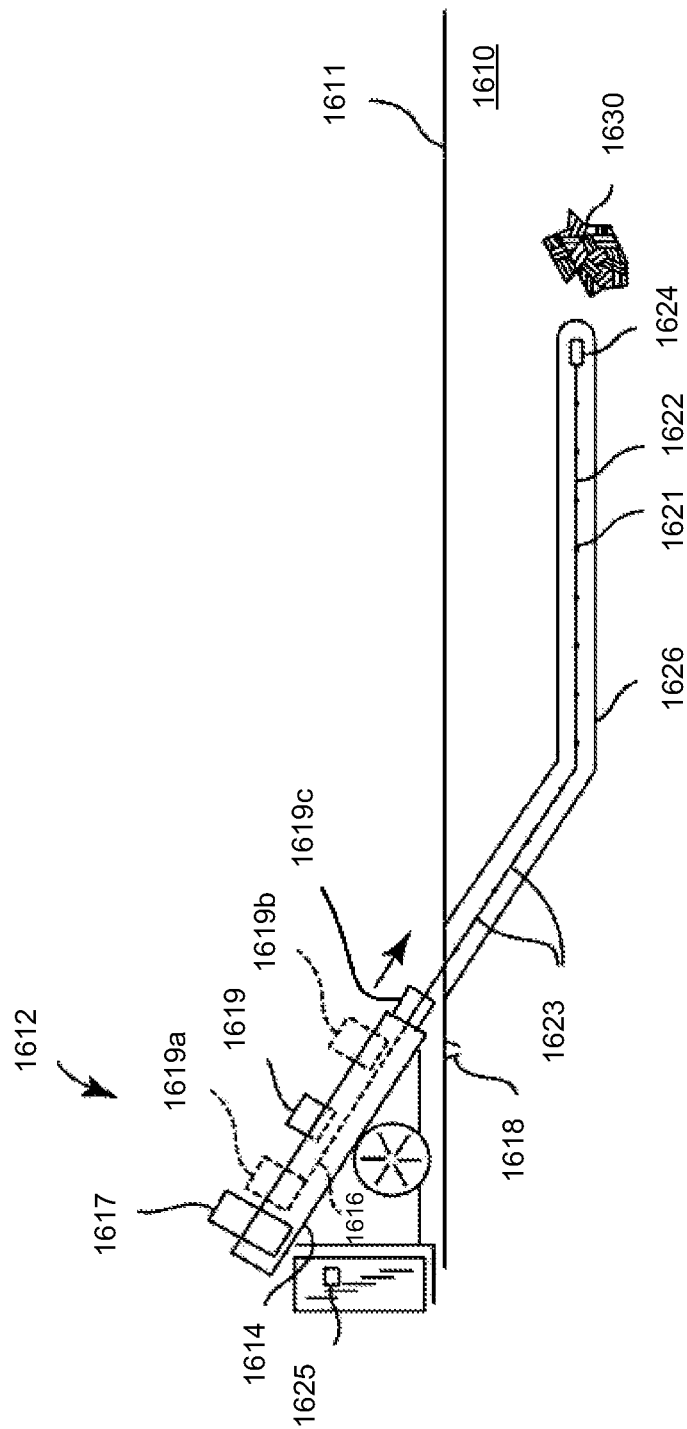
FIG. 16 shows a cross-section through a portion of ground where a boring operation takes place using an horizontal directional drilling machine configured for imaging underground objects using an offset frequency homodyne radar according to various embodiments.

FIG. 16 shows a cross-section through a portion of ground where a boring operation takes place. The underground boring system, generally shown as the HDD machine 1612, is situated above ground 1611 and includes a platform 1614 on which is situated a tilted longitudinal member 1616. The platform 1614 is secured to the ground by pins 1618 or other restraining members in order to resist platform 1614 movement during the boring operation. Located on the longitudinal member 1616 is a thrust/pullback pump 1617 for driving (i.e., displacing) a drill string 1622 in a forward, longitudinal direction as generally shown by the arrow. The drill string 1622 is made up of a number of drill string members 1623 attached end-to-end. Also located on the tilted longitudinal member 1616, and mounted to permit movement along the longitudinal member 1616, is a rotation motor or pump 1619 for rotating the drill string 1622 (illustrated in an intermediate position between an upper position 1619a and a lower position 1619b). In operation, the rotation motor 1619 rotates the drill string 1622 which has a boring tool 1624 attached at the distal end of the drill string 1622.

A typical boring operation can take place as follows. The rotation motor 1619 is initially positioned in an upper location 1619a and rotates the drill string 1622. While the boring tool 1624 is rotated through rotation of the drill string 1622, the rotation motor 1619 and drill string 1622 are pushed in a forward direction by the thrust/pullback pump 1617 toward a lower position into the ground, thus creating a borehole 1626. The rotation motor 1619 reaches a lower position 1619b when the drill string 1622 has been pushed into the borehole 1626 by the length of one drill string member 1623. A new drill string member 1623 is then added to the drill string 1622 either manually or automatically, and the rotation motor 1619 is released and pulled back to the upper location 1619a. The rotation motor 1619 is used to thread the new drill string member 1623 to the drill string 1622, and the rotation/push process is repeated so as to force the newly lengthened drill string 1622 further into the ground, thereby extending the borehole 1626.

Commonly, water or other fluid is pumped through the drill string 1622 (referred to herein as mud) by use of a mud pump. If an air hammer is used, an air compressor is used to force air/foam through the drill string 1622. The mud or air/foam flows back up through the borehole 1626 to remove cuttings, dirt, and other debris and improve boring effectiveness and/or efficiency.

A directional steering capability is typically provided for controlling the direction of the boring tool 1624, such that a desired direction can be imparted to the resulting borehole 1626. By these actions, and various combinations of these basic actions, a boring procedure can advance a boring tool 1624 through soil, including advancing the boring tool 1624 through a turn. Because HDD typically does not bore a hole very far from the surface of the ground, many belowground obstacles (e.g., sewers, electrical lines, building foundations, etc.) must be maneuvered around. As such, many boring tools are configured to allow the bore path to turn (e.g., left, right, higher, lower) to curve the bore path around underground obstacles.

In accordance with some embodiments, the system also includes an encoder 1619*c* to monitor of the position of the boring tool 1624. As the drill head 1624 is pushed into the ground, a cable plays out and advances the encoder 1619*c*, providing the system software with a measure of the drill head location and triggering radar electronics at discrete distance intervals.

The discussion and illustrations provided herein are presented in an exemplary format, wherein selected embodiments are described and illustrated to present the various aspects of the present invention. Systems, devices, or methods according to the present invention may include one or more of the features, structures, methods, or combinations thereof described herein. For example, a device or system may be implemented to include one or more of the advantageous features and/or processes described below. A device or system according to the present invention may be implemented to include multiple features and/or aspects illustrated and/or discussed in separate examples and/or illustrations. It is intended that such a device or system need not include all of the features described herein, but may be implemented to include selected features that provide for useful structures, systems, and/or functionality.

Although only examples of certain functions may be described as being performed by circuitry for the sake of brevity, any of the functions, methods, and techniques can be performed using circuitry and methods described herein, as would be understood by one of ordinary skill in the art.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A radar detection method, comprising:
   generating a baseband signal;
   up-converting the baseband signal to a radar signal frequency;
   filtering a lower sideband of the up-converted signal;
   transmitting the filtered up-converted signal, wherein generating, up-converting, filtering the lower sideband, and transmitting are implemented by a transmit section of a radar apparatus;
   receiving a return signal;
   down-converting the return signal using a signal having a frequency offset from the up-converted signal;
   filtering the upper sideband of the down-converted return signal; and
   producing a baseband return signal, wherein receiving, down-converting, filtering the upper sideband, and producing are implemented by a receive section of the radar apparatus;
   wherein the frequency offset is a predetermined frequency related to a width of a sideband filter used for filtering the upper sideband of the down-converted return signal.

2. The method of claim 1, wherein the baseband signal is an arbitrary waveform.

3. The method of claim 1, wherein the baseband signal comprises a single frequency.

4. The method of claim 1, wherein the baseband signal comprises a plurality of disparate frequency components.

5. The method of claim 1, further comprising:
   processing the baseband return signal to produce a time-domain signal; and
   displaying the time-domain signal on a display.

6. The method of claim 1, wherein the predetermined frequency is a frequency greater than or equal to a width of a sideband filter configured for filtering the upper sideband of the mixed receive signal.

7. The method of claim 1, further comprising:
   incrementing a frequency of a carrier signal used for up-converting the baseband signal to each of a plurality of disparate predetermined frequencies; and
   repeating the method for each of the plurality of disparate predetermined frequencies.

8. The method of claim 1, wherein the method is performed underground and for detecting subsurface objects.

9. A radar detection method, comprising:
   generating a baseband signal;
   mixing the baseband signal with a transmit oscillator signal to produce a mixed transmit signal comprising a lower sideband and an upper sideband;
   filtering the lower sideband of the mixed transmit signal;
   transmitting the filtered mixed transmit signal, wherein generating the baseband signal, mixing the baseband signal, filtering the lower sideband, and transmitting are implemented by a transmit section of a radar apparatus;
   receiving a return signal resulting from transmitting the filtered mixed transmit signal;
   generating a receive oscillator signal having a frequency offset from that of the transmit signal by a predetermined frequency;
   mixing the return signal with the receive oscillator signal to produce a mixed receive signal comprising a lower sideband and an upper sideband; and
   filtering the upper sideband of the mixed receive signal to produce a baseband return signal, wherein receiving, generating the receive oscillator signal, mixing the return signal, and filtering the upper sideband are implemented by a receive section of the radar apparatus;
   wherein the frequency offset is a predetermined frequency related to a width of a sideband filter used for filtering the upper sideband of the down-converted return signal.

10. The method of claim 9, wherein the baseband signal is an arbitrary waveform.

11. The method of claim 9, wherein the baseband signal comprises a single frequency.

12. The method of claim 9, wherein the baseband signal comprises a plurality of disparate frequency components.

13. The method of claim 9, further comprising:
    processing the baseband return signal to produce a time-domain signal; and
    displaying the time-domain signal on a display.

14. The method of claim 9, wherein the predetermined frequency is a frequency greater than or equal to a width of a sideband filter configured for filtering the upper sideband of the mixed receive signal.

15. The method of claim 9, wherein the method is performed underground and for detecting subsurface objects.

16. A radar apparatus, comprising:

an antenna arrangement;

a signal generator configured to generate a baseband signal;

a transmit section, coupled to the signal generator and the antenna arrangement, comprising a transmit oscillator operating at a predetermined frequency, the transmit section configured to:

generate a transmit signal comprising a mix of the baseband signal and a signal at the predetermined frequency; and filter a lower sideband of the mixed transmit signal;

a receive section, coupled to the antenna arrangement, comprising a sideband filter and a receive oscillator configured to operate at a frequency differing from that of the transmit oscillator by a predetermined frequency offset related to a width of the sideband filter, the receive section configured to:

mix a return signal received by the antenna arrangement and a signal produced by the receive oscillator with the predetermined frequency offset to produce a mixed receive signal comprising a lower sideband and an upper sideband; and filter the upper sideband of the mixed receive signal using the sideband filter to produce a baseband return signal.

17. The apparatus of claim 16, wherein the sideband filter comprises a Nyquist filter.

18. The apparatus of claim 16, wherein the radar apparatus is implemented as a ground penetrating radar.

19. The apparatus of claim 16, wherein the radar apparatus is implemented in a drill head of a horizontal directional drilling system.

20. The apparatus of claim 16, wherein the baseband signal is an arbitrary waveform.

21. The apparatus of claim 16, wherein the baseband signal comprises a single frequency.

22. The apparatus of claim 16, wherein the baseband signal comprises a plurality of disparate frequency components.

23. The apparatus of claim 16, further comprising:

a transform unit configured to transform the baseband return signal to a time-domain signal; and a user interface comprising a display and configured to present the time-domain signal on the display.

24. The apparatus of claim 16, wherein the predetermined frequency offset is a frequency greater than or equal to a width of the sideband filter.

\* \* \* \* \*